United States Patent
Fuwa et al.

(10) Patent No.: US 7,194,998 B2
(45) Date of Patent: Mar. 27, 2007

(54) CONTROL APPARATUS AND CONTROL METHOD FOR INTERNAL COMBUSTION ENGINE

(75) Inventors: Naohide Fuwa, Nishikamo-gun (JP); Takashi Hamada, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/491,879

(22) Filed: Jul. 25, 2006

(65) Prior Publication Data
US 2007/0039579 A1 Feb. 22, 2007

(30) Foreign Application Priority Data
Aug. 19, 2005 (JP) ............................. 2005-238407

(51) Int. Cl.
*F02D 13/00* (2006.01)
(52) U.S. Cl. .................... 123/346; 123/399; 123/90.15
(58) Field of Classification Search ............. 123/90.15, 123/346, 399
See application file for complete search history.

(56) References Cited

U.S. PATENT DOCUMENTS

| | | | |
|---|---|---|---|
| 2001/0032604 A1* | 10/2001 | Nishida et al. | 123/90.15 |
| 2001/0032613 A1* | 10/2001 | Arai et al. | 123/399 |
| 2006/0090728 A1* | 5/2006 | Arinaga et al. | 123/346 |
| 2006/0090729 A1* | 5/2006 | Miyanoo et al. | 123/346 |
| 2006/0130806 A1* | 6/2006 | Tsunooka et al. | 123/90.15 |
| 2006/0157024 A1* | 7/2006 | Tomii | 123/346 |

FOREIGN PATENT DOCUMENTS

| | | |
|---|---|---|
| JP | A 2002-349215 | 12/2002 |
| JP | A 2004-76265 | 3/2004 |

* cited by examiner

*Primary Examiner*—Erick Solis
(74) *Attorney, Agent, or Firm*—Kenyon & Kenyon LLP

(57) ABSTRACT

In an control apparatus and a control method for an internal combustion engine with a variable valve-characteristic mechanism that changes a valve characteristic that includes at least one of the duration and the maximum lift of an intake valve, the operating position of the mechanism is detected, and the mechanism is controlled so that a value of the valve characteristic corresponding to the operating position is equal to a target value corresponding to an engine operating state. After the target value is changed so that the intake valve opens/closes in accordance with a specific value of the valve characteristic, the operating position of the mechanism is learned as a reference position for the control of the valve characteristic. An intake-air-amount adjustment device upstream of the intake valve is controlled to offset the change in the amount of intake air caused by changing the target value when the reference position is learned.

13 Claims, 11 Drawing Sheets

CONTROL APPARATUS AND CONTROL METHOD FOR INTERNAL COMBUSTION ENGINE

INCORPORATION BY REFERENCE

The disclosure of Japanese Patent Application No. 2005-238407 filed on Aug. 19, 2005, including the specification, drawings and abstract is incorporated herein by reference in its entirety.

BACKGROUND OF THE INVENTION

1. Field of the Invention

The invention relates to a control apparatus and a control method for an internal combustion engine that includes a variable valve-characteristic mechanism that changes a valve characteristic that includes at least one of the duration and the maximum lift of an intake valve.

2. Description of the Related Art

In commonly-used valve systems for an internal combustion engine, an engine valve is closed by the force of a valve spring. When the engine valve is opened, the engine valve is pushed downward by the cam of a camshaft directly, or through a rocker arm or the like. In such valve systems, a valve characteristic of the engine valve, such as the duration and the maximum lift, is constant, irrespective of the engine operating state.

Recently, a valve-characteristic control apparatus for an internal combustion engine has been proposed. The control apparatus includes a variable valve-characteristic mechanism that changes the valve characteristic of the engine valve. By controlling the variable valve-characteristic mechanism, the engine valve opens and closes in accordance with a value of the valve characteristic appropriate for the current operating state of the internal combustion engine. The operating position of the variable valve-characteristic mechanism is detected, and the variable valve-characteristic mechanism is controlled so that a value of the valve characteristic corresponding to the operating position is equal to a target value of the valve characteristic corresponding to the operating state of the internal combustion engine.

In the valve-characteristic control apparatus, the operating position of the variable valve-characteristic mechanism detected by a sensor may deviate from the actual operating position due to differences in the output characteristic of the sensor, deviations in the positioning of the sensor, deterioration of the sensor with age, and the like. As such, it becomes difficult to open and close the engine valve in accordance with a value of the valve characteristic corresponding to the operating state of the internal combustion engine.

Accordingly, the target value of the valve characteristic is changed so that the engine valve opens and closes in accordance with a specific value of the valve characteristic. After the target value of the valve characteristic is changed, the operating position of the variable valve-characteristic mechanism is learned as a reference position for the control of the valve characteristic. For example, a target duration is changed so that an intake valve opens and closes in accordance with the shortest duration. Accordingly, the variable valve-characteristic mechanism is moved to an end of the movable range thereof. The operating position of the variable valve-characteristic mechanism at this time point is learned as the reference position. Further, Japanese Patent Application Publication No. JP-A-2002-349215 describes that the reference position is learned when the internal combustion engine is in a specific operating state (i.e., when fuel supply is stopped during deceleration).

The reference position is learned irrespective of the operation performed by the driver. When the reference position is learned, the target duration is changed from a value corresponding to the engine operating state to a value for opening and closing the intake valve in accordance with the shortest duration. By adjusting the duration of the intake valve to the new target duration, the amount of air taken into a cylinder is decreased, which decreases the output torque of the engine. However, decreases in the torque output of the engine that occur regardless of any operations performed by the driver may be disconcerting to the driver. Even if the learning process is executed only when the internal combustion engine is in a specific operating state (only when fuel supply is stopped during deceleration) as described in Japanese Patent Application Publication No. JP-A-2002-349215, a driver may still be perturbed by the effect of changes in the amount of air taken into the cylinder due to the learning process.

SUMMARY OF THE INVENTION

In view of the above, the invention provides a control apparatus for an internal combustion engine that reduces the likelihood that a driver is perturbed due to a change in the torque output of an internal combustion engine when a reference position for the control of a valve characteristic is learned.

An aspect of the invention provides a control apparatus for an internal combustion engine, which includes a variable valve-characteristic mechanism that changes a valve characteristic that includes at least one of the duration and the maximum lift of an intake valve. The control apparatus includes a controller. The controller detects the operating position of the variable valve-characteristic mechanism, and controls the variable valve-characteristic mechanism so that a value of the valve characteristic corresponding to the operating position is equal to a target value of the valve characteristic corresponding to an engine operating state. Also, the controller changes the target value of the valve characteristic so that the intake valve opens and closes in accordance with a specific value of the valve characteristic, and learns, as a reference position for the control of the valve characteristic, the operating position of the variable valve-characteristic mechanism after the target value of the valve characteristic is changed. Further, the controller controls an intake-air-amount adjustment device provided upstream of the intake valve so that the intake-air-amount adjustment device offsets the change in the amount of intake air caused by changing the target value of the valve characteristic when the reference position is learned.

The aforementioned control apparatus for the internal combustion engine includes the variable valve-characteristic mechanism and the controller. The variable valve-characteristic mechanism changes the valve characteristic that includes at least one of the duration and the maximum lift of the intake valve. The controller detects the operating position of the variable valve-characteristic mechanism, and controls the variable valve-characteristic mechanism so that the value of the valve characteristic corresponding to the operating position is equal to the target value of the valve characteristic corresponding to the engine operating state. Also, the controller changes the target value of the valve characteristic so that the intake valve opens and closes in accordance with the specific value of the valve characteristic, and learns, as the reference position for the control of the valve characteristic, the operating position of the variable valve-characteristic mechanism after the target value of the valve characteristic is changed. Further, the controller controls the intake-air-amount adjustment device provided upstream of the intake valve so that the intake-air-amount adjustment device offsets the change in the amount of intake air caused by changing the target value of the valve characteristic when the reference position is learned.

Another aspect of the invention provides a control method for an internal combustion engine which includes a variable valve-characteristic mechanism that changes a valve characteristic that includes at least one of the duration and the maximum lift of an intake valve. In the control method, the operating position of the variable valve-characteristic mechanism is detected, and the variable valve-characteristic mechanism is controlled so that a value of the valve characteristic corresponding to the operating position is equal to a target value of the valve characteristic corresponding to an engine operating state. Also, the target value of the valve characteristic is changed so that the intake valve opens and closes in accordance with a specific value of the valve characteristic, and after the target value of the valve characteristic is changed, the operating position of the variable valve-characteristic mechanism is learned as a reference position for the control of the valve characteristic. An intake-air-amount adjustment device provided upstream of the intake valve is controlled so that the intake-air-amount adjustment device offsets the change in the amount of intake air caused by changing the target value of the valve characteristic.

With the control apparatus having the aforementioned configuration and the control method, when the reference position is learned, the target value of the valve characteristic is changed from the value corresponding to the engine operating state to the value for opening and closing the intake valve in accordance with the specific value of the valve characteristic. When the valve characteristic of the intake valve is changed due to the change in the target value of the valve characteristic, the amount of intake air is changed, which may change the torque output of the internal combustion engine, irrespective of the operation performed by the driver.

In the control apparatus and the control method for the internal combustion engine, the intake-air-amount adjustment device provided upstream of the intake valve is controlled. The intake-air-amount adjustment device is operated according to the control, and the amount of intake air flowing in the area upstream of the intake valve is adjusted to offset the change in the amount of intake air that occurs when the target value of the valve characteristic is changed. This minimizes the effect that the change in the amount of intake air caused by changing the target value of the valve characteristic has on the torque output of the internal combustion engine. Doing so also reduces the likelihood that fluctuations in torque output associated with this process will perturb the driver.

BRIEF DESCRIPTION OF THE DRAWINGS

The features, advantages thereof, and technical and industrial significance of this invention will be better understood by reading the following detailed description of the example embodiments of the invention, when considered in connection with the accompanying drawings, in which.

DETAILED DESCRIPTION OF THE EXAMPLE EMBODIMENTS

Figure 1:
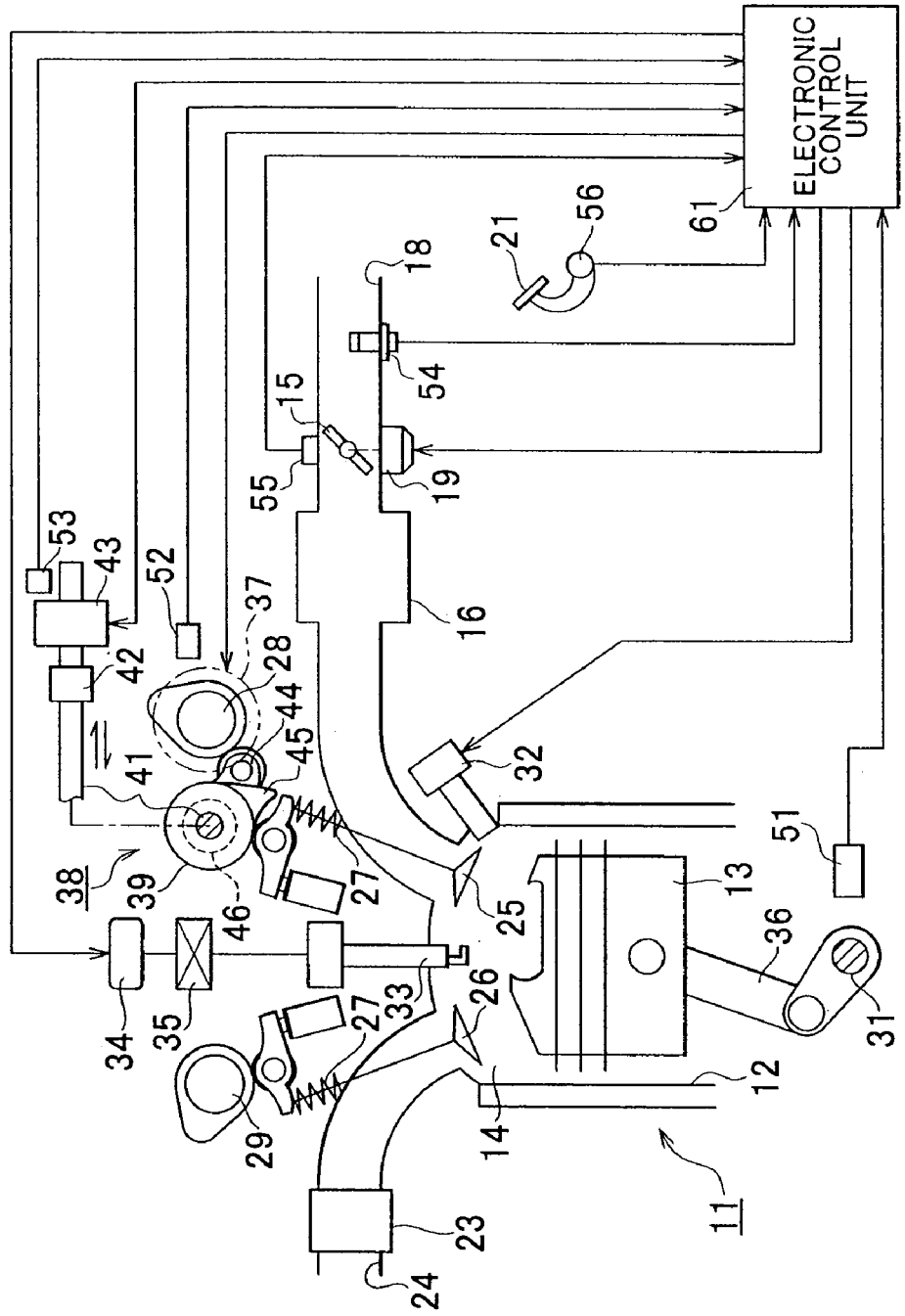
FIG. 1 is a schematic diagram showing the configuration of a control apparatus for an internal combustion engine according to a first embodiment of the invention.

In the following description and the accompanying drawings, the present invention will be described in more detail with reference to example embodiments. Hereinafter, a first embodiment of the invention will be described with reference to FIG. 1 to FIG. 6. As shown in FIG. 1, an internal combustion engine (hereinafter, simply referred to as "engine") 11, for example, a direct-injection gasoline engine, is provided in a vehicle. A piston 13 is housed in each cylinder 12 of the engine 11. The piston 13 reciprocates in the cylinder 12.

The combustion chamber 14 of each cylinder 12 is connected to a throttle valve 15 which adjusts the amount of intake air, and an intake passage 18 where a surge tank 16 is provided. Air outside the engine 11 is taken into the combustion chamber 14 through the intake passage 18. The throttle valve 15 is rotatably provided in the intake passage 18, and is driven by an actuator 19, which includes an electric motor. The actuator 19 rotates the throttle valve 15, according to, for example, the depression of an accelerator pedal 21 operated by the driver. The amount of air passing through the intake passage 18 (i.e., the amount of intake air)

changes according to the rotational angle of the throttle valve 15 (opening amount of the throttle valve 15), and the duration of an intake valve 25 (described later).

The combustion chamber 14 is connected to an exhaust passage 24 where a catalytic converter 23 is provided. Combustion gas generated in the combustion chamber 14 is discharged to the outside of the engine 11 through an exhaust passage 24.

Intake valves 25 and exhaust valves 26 are provided in the engine 11. Each intake valve 25 opens/closes the opening of the intake passage 18 into each cylinder 12. Each exhaust valve 26 opens/closes the opening of the exhaust passage 24 into each cylinder 12. The upward force of the valve spring 27 is applied to each intake valve 25 and each exhaust valve 26 so that the opening is closed.

An intake camshaft 28 is provided above the intake valve 25. An exhaust camshaft 29 is provided above the exhaust valve 26. The rotation of a crankshaft 31, which is the output shaft of the engine 11, is transmitted to the intake camshaft 28 and the exhaust camshaft 29. As a result, the intake camshaft 28 rotates, and pushes the intake valve 25 downward, overcoming the force of the valve spring 27 to open the opening of the intake passage 18 into the cylinder 12. Also, the exhaust camshaft 29 rotates, and pushes the exhaust valve 26 downward, overcoming the force of the valve springs 27 to open the opening of exhaust passage 24 into the cylinder 12.

In the engine 11, an electromagnetic fuel injection valve 32 is provided in each cylinder 12. When the fuel injection valve 32 is energized, the fuel injection valve 32 opens, and fuel is injected under high-pressure to the corresponding combustion chamber 14. The fuel is mixed with air taken into the combustion chamber 14 to form the air-fuel mixture.

In the engine 11, an ignition plug 33 is fitted to each cylinder 12. The ignition plug 33 fires in accordance with an ignition signal from an igniter 34. A high voltage output from an ignition coil 35 is applied to the ignition plug 33. The air-fuel mixture is ignited by spark discharge from the ignition plug 33, and burned. At this time, high-temperature and high-pressure combustion gas is generated, which reciprocates the piston 13. The reciprocating motion of the piston 13 is converted to rotational motion by a connecting rod 36. Then, the rotational motion is transmitted to the crankshaft 31. As a result, the crankshaft 31 rotates, and outputs the torque generated by the engine 11. Exhaust gas generated by combustion is discharged to the exhaust passage 24 when the exhaust valve 26 is opened.

A variable valve timing mechanism 37 is provided in the engine 11. The variable valve timing mechanism 37 changes the valve timing of the intake valve 25 with respect to the crank angle (rotational angle of the crankshaft 31), by changing the rotational phase of the intake camshaft 28 with respect to the crankshaft 31.

Figure 2:
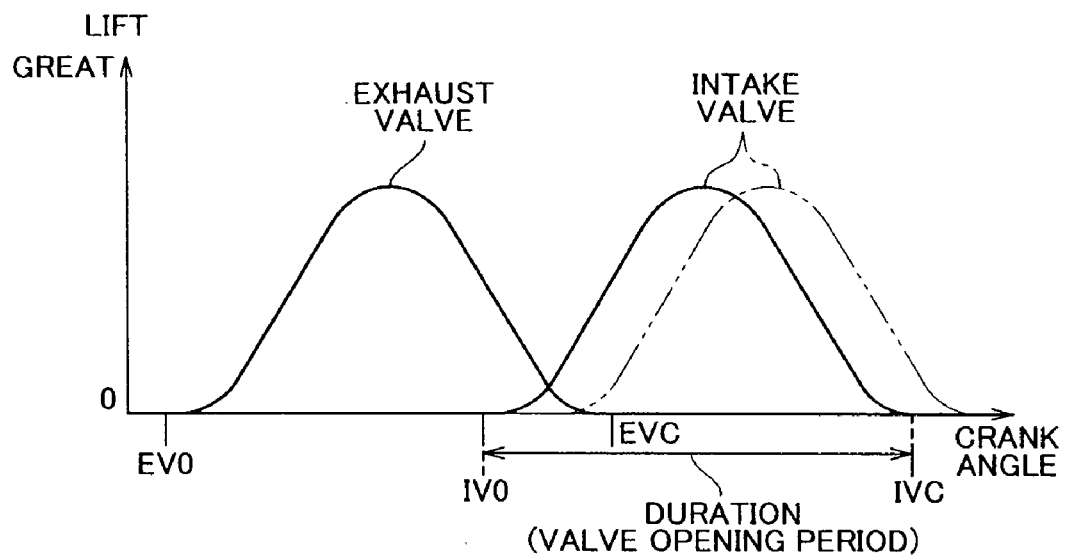
FIG. 2 is a graph showing the valve timing of an intake valve changed by a variable valve timing mechanism, and the valve timing of an exhaust valve.

For example, the valve timing of the intake valve 25 includes a valve opening timing IVO and a valve closing timing IVC, as shown in FIG. 2. The valve timing may be advanced or retarded while the duration of the intake valve (i.e., the period from the valve opening timing IVO to the valve closing timing IVC) is maintained at a constant value. In FIG. 2, the reference characters EVO and EVC denote the valve opening timing and the valve closing timing, respectively, of the exhaust valve 26.

As shown in FIG. 1, a variable duration mechanism 38, which is considered as the variable valve-characteristic mechanism, is also provided in the engine 11. The variable duration mechanism 38 changes the duration of the intake valve 25 as the valve characteristic of the intake valve 25.

Figure 3:
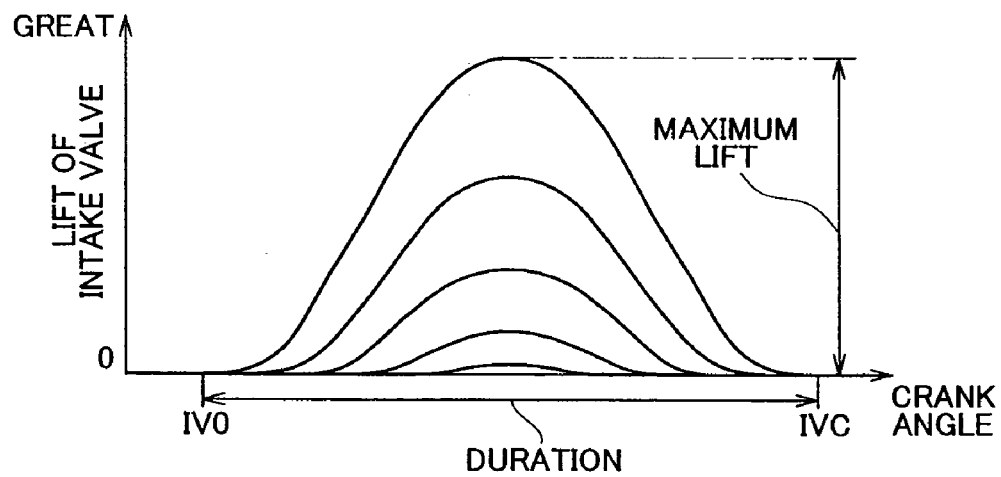
FIG. 3 is a graph showing changes in the valve characteristic (the duration and the maximum lift) of the intake valve.

As shown in FIG. 3, the duration indicates the duration from the valve opening timing IVO to the valve closing timing IVC of the intake valve 25, using the angle (crank angle). In this embodiment, the variable duration mechanism 38 continuously changes the maximum lift of the intake valve 25 as the valve characteristic of the intake valve 25. The maximum lift indicates the amount of movement (lift) of the intake valve 25 when the intake valve 25 is moved to the lowest position. The duration and the maximum lift are changed by the variable duration mechanism 38 in synchronization with each other. For example, as the duration decreases, the maximum lift decreases. As the duration decreases, the period between the valve opening timing IVO and the valve closing timing IVC of the intake valve 25 also decreases. As a result, the duration decreases, and the amount of air taken into each cylinder 12 is reduced.

As shown in FIG. 1, the variable duration mechanism 38 includes an intermediation driving mechanism 39 for each cylinder 12. The variable duration mechanism 38 further includes a control shaft 41, a rotary-to-linear motion conversion mechanism 42, and an electric motor 43 that are used to operate all the intermediate driving mechanisms 39. The electric motor 43 functions as an actuator. The control shaft 41 extends in a direction orthogonal to the surface of the drawing FIG. 1. However, to simplify the explanation, a portion of the control shaft 41 extends in the lateral direction in FIG. 1. The rotary-to-linear motion conversion mechanism 42 converts the rotation of the electric motor 43 to straight motion, and transmits the straight motion to the control shaft 41.

Each intermediation driving mechanism 39 includes an input arm 44, an output arm 45, and a slider gear 46. The input arm 44 and the output arm 45 are provided on the control shaft 41. The slider gear 46 is provided between the control shaft 41 and input and output arms 44 and 45.

When the intake cam shaft 28 rotates, the input arm 44 oscillates around the control shaft 41 upward and downward in the variable duration mechanism 38. The oscillation is transmitted to the output arm 45 via the slider gear 46. As a result, the output arm 45 is oscillated upward and downward. The intake valve 25 is driven and opened by the oscillating output arm 45.

When the electric motor 43 rotates and the control shaft 41 moves in the axial direction, the slider gear 46 moves in the axial direction and rotates. This changes the phase difference between the input and output arms 44 and 45 in the direction in which the input and output arms 44 and 45 oscillate. Due to this change in the phase difference, the duration of the intake valve 25 is continuously adjusted. When the phase difference decreases, the duration decreases, which reduces the amount of air taken into the cylinder 12. When the phase difference increases, the duration increases, which increases the amount of air taken into the cylinder 12.

In the engine 11, a pair of stoppers (not shown) is provided. The pair of stoppers limits the movable range in which each movable component of the variable duration mechanism 38 can move. The movable range includes the movable range in which the control shaft 41 can be moved in the axial direction, and the movable range in which the electric motor 43 can be rotated. In the movable range, an end at which the duration is shortest is referred to as "mechanical LOW end", and an end at which the duration is longest is referred to as "mechanical HIGH end". When the variable duration mechanism 38 is moved to decrease the duration and contacts the stopper at the mechanical LOW end, the stopper prevents the variable duration mechanism 38 from further moving to decrease the duration. When the variable duration mechanism 38 is moved to increase the duration and contacts the stopper at the mechanical HIGH end, the stopper prevents the variable duration mechanism 38 from further moving to increase the duration. In other words, when the variable duration mechanism 38 contacts the stopper at the mechanical LOW end, the intake valve 25 opens and closes in accordance with the shortest duration. When the variable duration mechanism 38 contacts the stopper at the mechanical HIGH end, the intake valve 25 opens and closes in accordance with the longest duration.

Thus, the amount of intake air can be adjusted by changing duration of the intake valve 25 in addition to adjusting the opening amount of the throttle valve. Therefore, the amount of intake air can be maintained at a constant value by combining the opening amount of the throttle valve and the duration. For example, the amount of air taken into the cylinder 12 can be maintained at a constant value by decreasing the opening amount of the throttle valve 15 as the duration of the intake valve 25 increases, or by increasing the opening amount of the throttle valve 15 as the duration of the intake valve 25 decreases.

When the amount of intake air is decreased by decreasing the duration, pumping loss can be reduced as compared to when the amount of intake air is decreased only by decreasing the opening amount of the throttle valve 15. Accordingly, loss in the output of the engine 11 can be suppressed, and fuel efficiency can be improved.

Further, various sensors, which detect the states of respective portions of the vehicle, are fitted to the vehicle. For example, the sensors include a crank angle sensor 51, a cam angle sensor 52, a position sensor 53, an air flow meter 54, a throttle sensor 55, and an accelerator sensor 56.

The crank angle sensor 51 generates a pulsed signal each time the crankshaft 31 is rotated by a certain angle. This signal is used to calculate, for example, the crank angle that is the rotational angle of the crankshaft 31, and an engine rotational speed that is the rotational speed of the crankshaft 31 per unit time. The cam angle sensor 52 detects the rotational angle of the intake camshaft 28. The position sensor 53 detects the operating position of the variable duration mechanism 38. The air flow meter 54 detects the amount of intake air flowing in the intake passage 18. The throttle sensor 55 detects the opening amount of the throttle valve 15. The accelerator sensor 56 detects the depression amount of the accelerator pedal 21 operated by the driver.

The position sensor 53 may detect any one of movable portions of the variable duration mechanism 38. In this embodiment, an encoder is used as the position sensor 53. The encoder outputs a pulsed signal each time the electric motor 43 is rotated by a certain angle, that is, each time the variable duration mechanism 38 is operated by a certain operation amount. When the variable duration mechanism 38 contacts the stopper at the mechanical LOW end, the operating position of the variable duration mechanism 38 is regarded as a reference position. Counting of the number of pulsed signals starts when the variable duration mechanism 38 is in the reference position. Based on the number of pulsed signals counted, the operating position of the variable duration mechanism 38 is detected (calculated).

An electronic control unit 61 is provided in the vehicle. The electronic control unit 61 controls components such as the engine 11 based on the detection signals from the sensors 51 to 56. The electronic control unit 61 executes a learning process, a valve characteristic control, and an intake amount control. The electronic control unit 61 includes a microcomputer. A central processing unit (CPU) executes computations according to control programs, initial data, control maps, and the like that are stored in read-only memory (ROM). On the basis of the results of the computations, various controls are executed. The results of the computations executed by the CPU are temporarily stored in random access memory (RAM). The electronic control unit 61 further includes a back-up RAM that stores various data even after supply of electric power to the electronic control unit 61 is stopped.

The electronic control unit 61 controls fuel injection from the fuel injection valve 32, for example, by controlling supply of electric power to the fuel injection valve 32. In this fuel injection control, a basic injection amount (basic injection period) is calculated based on parameters indicating the operating state of the engine 11, such as the engine rotational speed and an engine load. The basic injection amount is the amount of fuel injected to make the air-fuel ratio of the air-fuel mixture equal to a predetermined value. The engine load is obtained, for example, based on the amount of air taken into the engine 11, or a parameter related to the amount of intake air (such as the opening amount of the throttle valve 15 and the depression amount of the accelerator pedal 21). The basic injection amount thus obtained is corrected based on the signals from the sensors. Electric power is supplied to the fuel injection valve 32 for a period corresponding to the corrected injection amount. As a result, the fuel injection valve 32 is opened, and the corrected injection amount of fuel is injected.

The electronic control unit 61 controls the valve timing of the intake valve 25 by controlling the variable valve timing mechanism 37. In this valve timing control, a target valve timing, which is a target value for the control of the valve timing of the intake valve 25, is calculated based on parameters indicating the operating state of the engine 11, such as the engine rotational speed and the engine load. The variable valve timing mechanism 37 is controlled so that the actual valve timing of the intake valve 25 is equal to the target valve timing. The actual valve timing is obtained based on values detected by the crank angle sensor 51 and the cam angle sensor 52. As a result of the control, the intake valve 25 opens and closes at the valve timing appropriated for the operating state of the engine 11.

Further, as described above, the amount of air taken into the cylinder 12 can be adjusted by adjusting the duration of the intake valve 25 in addition to adjusting the opening amount of the throttle valve 15. Therefore, the electronic control unit 61 executes a cooperative control of the duration and the opening amount of the throttle valve 15, thereby controlling the actual amount of air taken into the cylinder 12 to the value appropriate for the operating state of the engine 11.

In this control, a target intake air amount Tga is calculated based on parameters indicating the operating state, such as the depression amount of the accelerator pedal 21 and the rotational speed. Also, a target duration Tca (target valve characteristic) and a target throttle valve opening amount Tta are calculated. The target duration Tca and the target throttle valve opening amount Tta are target values used to achieve the target intake amount Tga. The target duration Tca is calculated based on the target intake amount Tga and the engine rotational speed. The target throttle valve opening amount Tta is calculated based on the target intake amount Tga, target duration Tca, and the engine rotational speed.

Using the target throttle valve opening amount Tta as a command value, electric power is supplied to the actuator 19 for the throttle valve 15 so that the actual opening amount of the throttle valve 15 detected by the throttle sensor 55 is equal to the target throttle valve opening amount Tta.

As described above, the operating position of the variable duration mechanism 38 is calculated based on the number of pulsed signals output from the position sensor 53. Supply of electric power to the electric motor 43 is controlled so that the duration corresponding to the operating position is equal to the target duration Tca.

The normal range of the operating position of the variable duration mechanism 38 corresponding to the target duration Tca is narrower than the movable range of the variable duration mechanism 38 which is limited by the aforementioned stoppers. In this normal range of the operating position of the variable duration mechanism 38 corresponding to the target duration Tca, an end at which the target duration is shortest is referred to as "control LOW end", and an end at which the target duration is longest is referred to as "control HIGH end". The target duration Tca corresponding to the control LOW end is slightly greater than the duration corresponding to the mechanical LOW end. The target duration Tca corresponding to the control HIGH end is slightly smaller than the duration corresponding to the mechanical HIGH end. Accordingly, if the target duration Tca is set to a value corresponding to the operating position of the variable duration mechanism 38 in the aforementioned normal range when the electric motor 43 is controlled, the variable duration mechanism 38 does not contact the stoppers at the mechanical LOW end and the mechanical HIGH end.

If the operating position of the variable duration mechanism 38 calculated based on the number of pulsed signals from the position sensor 53 is deviated from the actual operating position, it is difficult to make the actual duration equal to the target duration.

In this case, the target duration Tca is changed so that the intake valve 25 opens and closes in accordance with a specific duration. After the target duration Tca is changed, the operating position of the variable duration mechanism 38 is learned as the reference position for the control of the duration. In this embodiment, the shortest duration of the intake valve 25 (i.e., the duration corresponding to the mechanical LOW end) is used as the specific duration. The target duration Tca is changed to a value smaller than or equal to the specific duration. Therefore, by controlling the electric motor 43 based on the changed target duration Tca, the variable duration mechanism 38 contacts the stopper at the mechanical LOW end, which prevents the variable duration mechanism 38 from further moving to decrease the duration. The operating position of the variable duration mechanism 38 at this time point is learned as the reference position.

That is, after the variable duration mechanism 38 is moved to the mechanical LOW end at which the duration becomes shorter than that at the control LOW end, the operating position of the variable duration mechanism 38 is learned as the reference position. This is partly because the torque output of the engine 11 changes by only a small amount due to the change in the duration as compared to the case where the operating position other than the aforementioned operating position is learned as the reference position.

Figure 4:
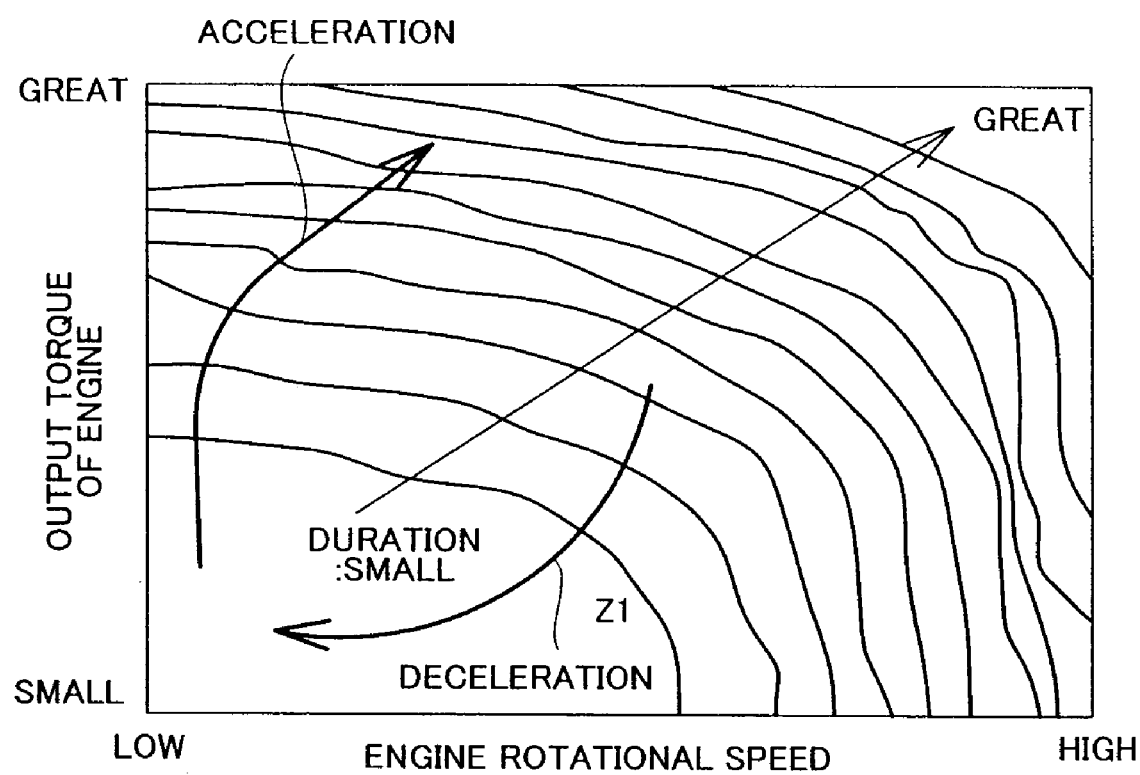
FIG. 4 is a graph showing the relation between the rotational speed/output torque of an engine and the duration.

FIG. 4 shows the relation between the rotational speed/output torque of the engine and the duration required to achieve the rotational speed/output torque of the engine. As shown in FIG. 4, as the engine rotational speed increases, or as the output torque increases, the required duration increases. Further, the output torque may vary at the same duration. For example, in a region Z1 that includes the duration corresponding to the control LOW end, the duration can be changed by only a small amount. Therefore, it is difficult to decrease the torque output of the engine 11 by decreasing the duration to decrease the amount of intake air. Accordingly, the torque output of the engine 11 is decreased by rotating the throttle valve 15 so that the opening amount of the throttle valve 15 and the amount of intake air are decreased. Because the throttle valve 15 upstream of the intake valve 25 is rotated so that the opening amount of the throttle valve 15 and the amount of intake air are decreased, the intake valve 25 does not greatly contribute to decreasing the amount of intake air. Even if the duration is decreased, the amount of intake air is not greatly changed, and the torque output is not greatly changed by the change in the amount of intake air. Thus, it is less likely that the driver will notice the change in torque output of the engine. Accordingly, as described above, after the variable duration mechanism 38 is moved to the mechanical LOW end at which the duration is shorter than that at the control LOW end, the operating position of the variable duration mechanism 38 is learned as the reference position.

When the reference position is learned in the aforementioned manner, the target duration Tca is changed from a value corresponding to the engine operating state to a value smaller than the value corresponding to the engine operating state (i.e., the value smaller than the value corresponding to the control LOW end). As the duration of the intake valve 25 is decreased due to the change in the target duration Tca, the amount of air taken into the cylinder 12 is decreased, and therefore the torque output of the engine 11 is decreased. The decrease in torque output may be noticed by the driver, which may cause the driver to worry. Accordingly, in this embodiment, when the learning process is executed, the throttle valve 15 is rotated so that the opening amount of the throttle valve 15 is increased to offset the change in the amount of intake air caused by changing the target duration Tca.

Figure 5:
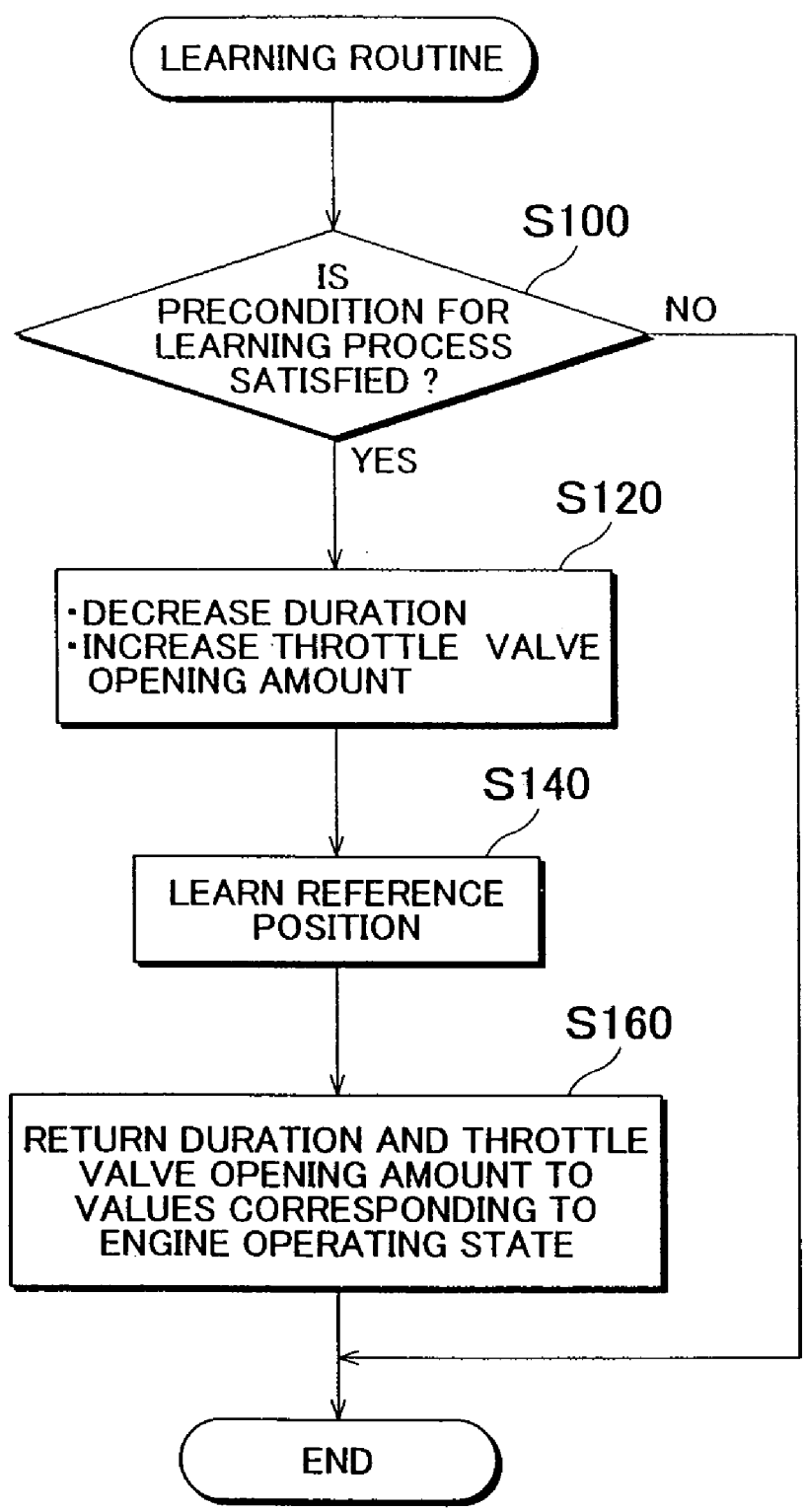
FIG. 5 is a flowchart showing steps of learning a reference position.

The flowchart in FIG. 5 shows a routine for learning the aforementioned reference position, which is executed by the electronic control unit 61. In this learning routine, first, the electronic control unit 61 determines whether a precondition for the learning process is satisfied in step 100. The precondition is that the engine 11 is not in a steady state. For example, it is preferable to execute the learning process when the engine 11 decelerates. When the engine 11 is in a steady state, the operating state of the engine 11 is not greatly changed, as compared to the other operating state. Therefore, if the torque output of the engine 11 is changed, the driver is likely to feel the change in the output torque. When the engine 11 accelerates, the duration remains shorter than the duration corresponding to the control LOW end for only a short period. Therefore, it is difficult to execute the learning process during this short period. Also, because the amount of intake air would be decreased by decreasing the duration if the learning process is executed during acceleration, acceleration performance is reduced. In contrast, when the engine 11 decelerates, the duration remains shorter than the duration corresponding to the control LOW end for a long period. Also, even if the amount of intake air is decreased by decreasing the duration during deceleration, it is unlikely to impact deceleration in a manner that the driver would notice. Accordingly, it is preferable to execute the learning process during deceleration, because the driver is unlikely to notice any change, and sufficient time can be secured for the learning process.

It is more preferable to execute the learning process when fuel supply is stopped during deceleration of the engine 11 to improve fuel efficiency. When fuel supply is stopped, the air-fuel mixture is not burned. Therefore, even if the amount of intake air is decreased by decreasing the duration, the torque output of the engine 11 is not greatly influenced.

If the precondition for the learning process is not satisfied in step 100, it is determined that the learning process should not be executed, and the learning routine is terminated. If the precondition for the learning process is satisfied in step 100, the duration is decreased and the opening amount of the throttle valve 15 is increased in step 120.

When the duration is decreased, the target duration Tca, which is separately calculated based on the engine operating state at the time point when the precondition for the learning process is satisfied, is changed so that the intake valve 25 opens and closes in accordance with the duration corresponding to the mechanical LOW end. More specifically, the target duration Tca is decreased to the value slightly smaller than the duration corresponding to the mechanical LOW end, by adding a predetermined correction value Kca (<0) to the target duration Tca corresponding to the engine operating state. Then, the electric motor 43 is controlled so that the duration corresponding to the operating position of the variable duration mechanism 38 detected by the position sensor 53 is equal to the changed target duration Tca. As a result of this control, the variable duration mechanism 38 is moved to decrease the duration. When the variable duration mechanism 38 contacts the stopper at the mechanical LOW end, the stopper prevents the variable duration mechanism 38 from further moving to decrease the duration. Accordingly, the intake valve 25 continues to be opened and closed in accordance with the duration corresponding to the mechanical LOW end. As a result, the amount of intake air passing through the intake valve 25 becomes smaller than that before the target duration Tca is changed. Also, because the stopper at the mechanical LOW end prevents the variable duration mechanism 38 from further moving to decrease the duration, the electric motor 43 stops rotating, and the position sensor 53 stops outputting the pulsed signal.

When the opening amount of the throttle valve 15 is increased, a correction value Kta (>0) of the target throttle valve opening amount Tta, which corresponds to the correction value Kca of the target duration Tca, is obtained. The correction value Kta is the amount by which the target throttle valve opening amount Tta needs to be changed to offset the change (decrease) in the amount of intake air caused by decreasing the duration. The correction value Kta is obtained by multiplying the absolute value of the correction value Kca by a coefficient α (>0). The target throttle valve opening amount Tta for the learning process is set to a value obtained by adding the correction value Kta to the target throttle valve opening amount Tta that is separately calculated based on the engine operating state at the time point when the precondition for the learning process is satisfied. The target throttle valve opening amount Tta is increased in this manner. Then, the actuator 19 is controlled so that the actual throttle valve opening amount detected by the throttle sensor 55 is equal to the increased target throttle valve opening amount Tta. As a result of this control, the throttle valve 15 is rotated so that the opening amount of the throttle valve 15 is increased, and the amount of intake air passing through the throttle valve 15 becomes greater than that before the throttle valve opening amount Tta is changed.

Next, in step 140, the operating position of the variable duration mechanism 38, that is, the operating position of the variable duration mechanism 38 that contacts the mechanical LOW end is learned as the reference position for the control of the duration. For example, the counted number of the pulsed signals output from the position sensor 53 is set to "0".

Subsequently, in step 160, each of the duration and the throttle valve opening amount is returned to the value corresponding to the engine operating state. More specifically, the final target duration Tca is set to the target duration Tca that is separately calculated based on the engine operating state at the time point. In other words, the correction value Kca, which is used to decrease the target duration Tca when the learning process is executed, is set to "0", that is, the target duration Tca is not decreased. Then, the electric motor 43 is controlled so that the duration corresponding to the operating position of the variable duration mechanism 38 detected by the position sensor 53 is equal to the target duration Tca. As a result of this control, the variable duration mechanism 38 is moved to increase the duration, and the intake valve 25 opens and closes in accordance with the duration corresponding to the engine operating state. As a result, the amount of intake air passing through the intake valve 25 becomes greater than that when the target duration Tca is changed to execute the learning process.

The final target throttle valve opening amount Tta is set to the target throttle valve opening amount Tta that is separately calculated based on the engine operating state at the time point. In other words, the correction value Kta, which is used to offset the change (decrease) in the amount of intake air caused by decreasing the target duration Tca when the reference position is learned, is set to "0", that is, the target throttle valve opening amount Tta is not increased. Then, the actuator 19 for the throttle valve is controlled so that the actual throttle valve opening amount detected by the throttle sensor 55 is equal to the target throttle valve opening amount Tta. If the engine operating state is not changed when the reference position is learned, the actuator 19 is controlled to decrease the opening amount of the throttle valve 15. As the result, the amount of intake air passing through the throttle valve 15 becomes smaller than that when the target throttle valve opening amount Tta is changed to execute the learning process.

After step 160 is executed, the learning routine is terminated. After the learning routine is executed, the engine rotational speed, the target throttle valve opening amount Tta, and the target duration Tca are changed according to the depression of the accelerator pedal 21 operated by the driver, for example, in the manner shown in FIG. 6. In the example shown in FIG. 6, the accelerator pedal 21 is depressed by a certain amount in a period before time point t1. The accelerator pedal 21 is returned to its original position during a period from time point t1 to time point t2, and the accelerator pedal 21 is not depressed after time point t2. The engine rotational speed gradually decreases according to the depression of the accelerator pedal 21 after time point t1. The engine rotational speed reaches an idling rotational speed at time point t5. The target throttle valve opening amount Tta and the target duration Tca decrease as the depression amount of the accelerator pedal 21 and the engine rotational speed decrease during the period from time point t1 to time point t2. As a result, at time point t2, the target duration Tca is equal to the value corresponding to the control LOW end, that is, the smallest value obtained by the control.

If the precondition for the learning process is satisfied at time point t3 during deceleration (YES in step 100), the target duration Tca is decreased, and set to the value slightly smaller than the value corresponding to the mechanical LOW end. The electric motor 43 is controlled so that the duration corresponding to the operating position of the variable duration mechanism 38 detected by the position sensor 53 is equal to the target duration Tca. As a result of the control, the electric motor 43 is rotated, which moves the variable duration mechanism 33 to decrease the duration until the variable duration mechanism 33 contacts the stopper at the mechanical LOW end. The stopper at the mechanical LOW end prevents the variable duration mechanism 38 from further decreasing the duration.

At time point t3, the target throttle valve opening amount Tta is increased. The actuator 19 for the throttle valve 15 is controlled so that the actual throttle valve opening amount detected by the throttle sensor 55 is equal to the target throttle valve opening amount Tta. As a result of this control, the actuator 19 is operated, and the throttle valve 15 is rotated so that the opening amount of the throttle valve 15 is increased. The change (decrease) in the amount of intake air caused by decreasing the target duration Tca is offset by increasing the target throttle valve opening amount Tta. Then, the reference position for the control of the duration is learned (step 140).

After the reference position is learned, at time point t4, the final target duration Tca is set to the target duration Tca that is separately calculated based on the engine operating state at the time point. The electric motor 43 is controlled so that the duration corresponding to the operating position of the variable duration mechanism 38 detected by the position sensor 53 is equal to the target duration Tca. As a result, the variable duration mechanism 38 is moved to increase the duration, and the intake valve 25 opens and closes in accordance with the duration corresponding to the engine operating state.

At time point t4, the final throttle valve opening amount Tta is set to the target throttle valve opening amount Tta that is separately calculated based on the engine operating state at the time point. The actuator 19 for the throttle valve 15 is controlled so that the actual throttle valve opening amount detected by the throttle sensor 55 is equal to the target throttle valve opening amount Tta. As a result, the throttle valve 15 is rotated in accordance with the throttle valve opening amount corresponding to the engine operating state.

According to the first embodiment that has been described in detail, the following effects can be obtained.

(1) When the reference position for the control of the duration is learned, the target duration Tca is changed from the value corresponding to the engine operating state to the value for opening and closing the intake valve 25 in accordance with the specific duration (i.e., the duration corresponding to the mechanical LOW end). If the duration of the intake valve 25 is decreased due to the change in the target duration Tca, the torque output of the engine 11 may be decreased irrespective of the driver's operation However, in the first embodiment, when the reference position is learned, the target throttle valve opening amount Tta is increased, and the throttle valve 15 upstream of the intake valve 25 is rotated so that the opening amount of the throttle valve 15 is increased, which offsets the decrease in the amount of intake air caused by decreasing the duration. This reduces the possibility that a problem occurs due to the decrease in the amount of intake air caused by changing the target duration Tca, that is, the driver is less likely to be alarmed by the sudden decrease in the torque output of the engine 11.

Next, a second embodiment of the invention will be described with reference to FIG. 7 to FIG. 12. In the engine 11, the surge tank 16 is provided between the throttle valve 15 and the intake valve 25. Therefore, if the throttle valve 15 is rotated so that the opening amount of the throttle valve 15 is increased to offset the decrease in the amount of intake air caused by decreasing the target duration Tca when the reference position is learned, there is a delay before the actual pressure of intake air between the throttle valve 15 and the intake valve 25 becomes equal to the pressure corresponding to the opening amount of the throttle valve 15 (during a transition period). This delay makes it difficult to obtain a sufficient amount of intake air to offset the change in the amount of intake air caused by decreasing the target duration Tca.

The similar phenomenon occurs also when the throttle valve 15 is operated so that the opening amount of the throttle valve 15 is returned to the value corresponding to the engine operating state after the reference position is learned. In this case as well, there is a delay before the actual pressure of intake air between the throttle valve 15 and the intake valve 25 becomes equal to the pressure corresponding to the opening amount of the throttle valve 15 (during the transition period). This delay makes it difficult to offset the change in the amount of intake air caused by increasing the target duration Tca.

Accordingly, in the second embodiment, the target duration Tca is gradually decreased when the precondition for the learning process is satisfied. Because the target duration Tca is gradually changed, the target throttle valve opening amount Tta is also gradually increased.

Further, after the reference position is learned, the target duration Tca is gradually increased to the value corresponding to the engine operating state. Also, the target throttle valve opening amount Tta is gradually decreased to the value corresponding to the engine operating state, according to the gradual change in the target duration Tca. The configurations of the engine 11, the variable duration mechanism 38, and the like are the same as those in the first embodiment.

Figure 7:
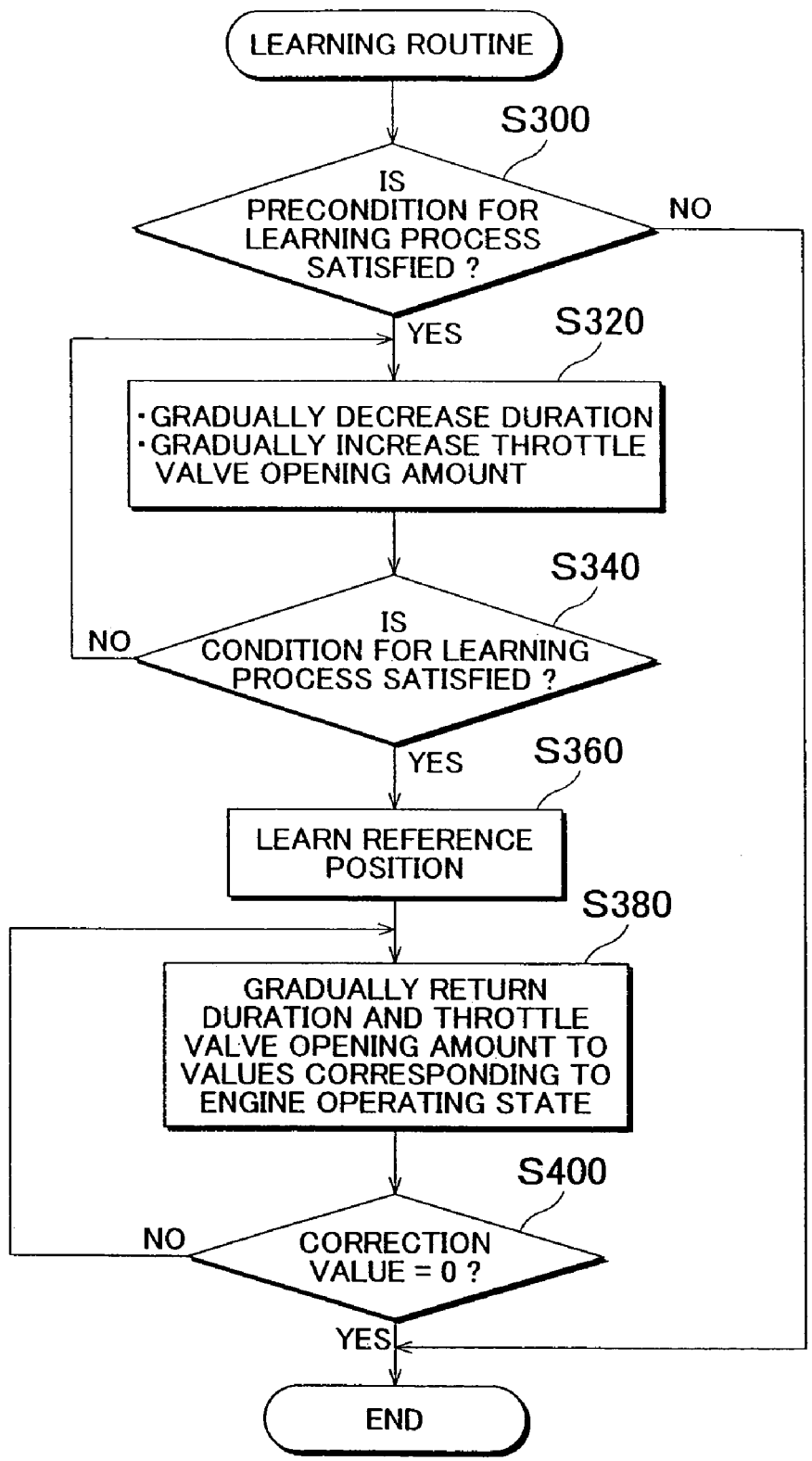
FIG. 7 is a flowchart showing steps of learning the reference position according to a second embodiment of the invention.

FIG. 7 is a flowchart of a routine for learning the reference position, which is executed by the electronic control unit 61. This learning routine is set on the assumption that the engine operating state is not changed or hardly changed when the reference position is learned.

In the learning routine, first, the electronic control unit 61 determines whether the precondition for the learning process is satisfied in step 300. The precondition is the same as that in step 100 in FIG. 5.

If the precondition for the learning process is not satisfied in step 300, it is determined that the learning process should not be executed, and the learning routine is terminated. If the precondition for the learning process is satisfied in step 300, the duration is gradually decreased and the opening amount of the throttle valve 15 is gradually increased in step 320.

Figure 8:
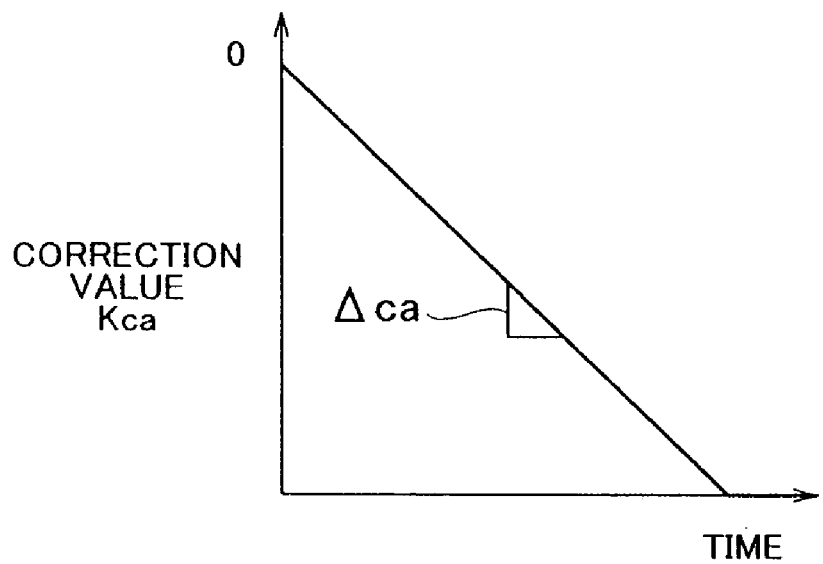
FIG. 8 is a schematic diagram showing the structure of a map used to determine a correction value Kca.

When the duration is gradually decreased, for example, a map shown in FIG. 8 is used. In the map, the relation between an elapsed time and the correction valve Kca is defined. The correction value Kca is "0" when the elapsed time is "0". The correction value Kca decreases at a constant rate Δca as the time elapses. The rate Δca is (the absolute value of) the amount of change in the correction value Kca per unit time. The time point at which the precondition for the learning process is satisfied is used as a reference time point (elapsed time: 0). The correction value Kca is read from the map at certain time intervals after the precondition for the learning process is satisfied. The final target duration Tca at each time interval is set to a value obtained by adding the correction value Kca to the target duration Tca that is separately calculated based on the engine operating state. Because the correction value Kca decreases as the time elapses, the final target duration Tca gradually decreases as the time elapses.

Accordingly, the variable duration mechanism 38 is gradually moved to gradually decrease the duration, by controlling the electric motor 43 so that the duration corresponding to the operating position of the variable duration mechanism 38 detected by the position sensor 53 is equal to the target duration Tca. As a result, the amount of intake air passing through the intake valve 25 is gradually decreased. When the variable duration mechanism 38 contacts the stopper at the mechanical LOW end, the stopper prevents the variable duration mechanism 38 from further moving to decrease the duration. The intake valve 25 continues to be opened and closed in accordance with the duration corresponding to the mechanical LOW end. As a result, air of the amount corresponding to the duration is taken into the cylinder 12. Also, because the stopper at the mechanical LOW end prevents movement of the variable duration mechanism 38, the electric motor 43 stops rotating, and the position sensor 53 stops outputting the pulsed signal.

Even after the movement of the variable duration mechanism 38 is prevented and the duration is no longer changed, the target duration Tca continues to be decreased. Therefore, the target duration Tca deviates from the actual duration.

Figure 9:
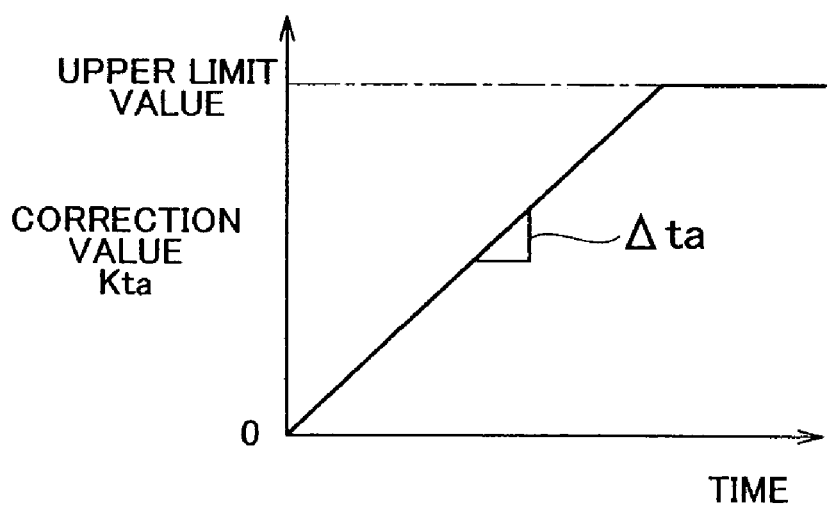
FIG. 9 is a schematic diagram showing the structure of a map used to determine a correction value Kta.

When the opening amount of the throttle valve 15 is gradually increased in step 320, for example, a map shown in FIG. 9 is used. In the map, the relation between the elapsed time and the correction value Kta ($|Kca| \times \alpha$) is defined. In this map, the correction value Kta is "0" when the elapsed time is "0". The upper limit value of the correction value Kta is set. The correction value Kta increases at a constant rate $\Delta$ta as the time elapses until the correction value Kta reaches the upper limit value. The rate $\Delta$ta is (the absolute value) of the amount of change in the correction value Kta per unit time. The rate $\Delta$ta is set to the same value as the rate $\Delta$ca of the correction value Kca.

After the correction value Kta reaches the upper limit value, the correction value Kta remains the upper limit value irrespective of the elapsed time. The upper limit value of the correction value Kta is equivalent to the amount by which the target throttle valve opening amount Tta needs to be changed to offset the decrease in the amount of intake air caused by decreasing the target duration Tca to the value corresponding to the mechanical LOW end. The upper limit value is obtained by multiplying the absolute value of the correction value Kca by the coefficient $\alpha$.

The time point at which the precondition for the learning process is satisfied is used as a reference time point (elapsed time: 0). The correction value Kta is read from the map in FIG. 9 each time a certain time elapses after the precondition for the learning process is satisfied. The target throttle valve opening amount Tta for the learning process is set to a value obtained by adding the correction value Kta to the target throttle valve opening amount Tta that is separately calculated based on the engine operating state. The target throttle valve opening amount Tta that is set is gradually increased as the time elapses for a while after the precondition for the learning process is satisfied. Then, the target throttle valve opening amount Tta is maintained at a constant value.

Thus, the throttle valve 15 is gradually rotated so that the opening amount of the throttle valve 15 is gradually increased, by controlling the actuator 19 so that the actual throttle valve opening amount detected by the throttle sensor 55 is equal to the target throttle valve opening amount Tta. Accordingly, the amount of intake air passing through the throttle valve 15 becomes greater than that when the precondition for the learning process is satisfied. After the opening amount of the throttle valve 15 reaches a certain value, the throttle valve 15 stops rotating.

Next, it is determined whether a condition for the learning process is satisfied in step 340 in FIG. 7. This step is executed to determine whether the variable duration mechanism 38 actually contacts the stopper at the mechanical LOW end so that the reference position can be learned. In view of this, the condition for the learning process is set. For example, the condition for the learning process is that the actual duration corresponding to the operating position of the variable duration mechanism 38 detected by the position sensor 53 is different from the target duration Tca, but the position sensor 53 has not output the pulsed signal for a predetermined period.

If the condition for the learning process is not satisfied in step 340, the routine returns to step 320. If the condition for the learning process is satisfied, the routine proceeds to step 360. In step 360, the operating position of the variable duration mechanism 38 at the time point, that is, the operating position of the variable duration mechanism 38 that contacts the stopper at the mechanical LOW end is learned as the reference position for the control of the duration.

Figure 10:
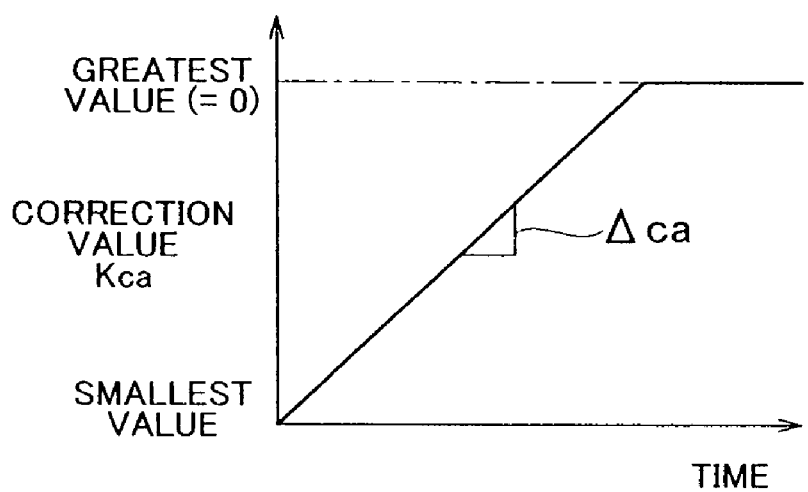
FIG. 10 is a schematic diagram showing the structure of a map used to determine the correction value Kca.

Subsequently, in step 380, the duration and the opening amount of the throttle valve 15 gradually returned to the respective values corresponding to the engine operating state. When the duration is gradually returned to the value corresponding to the engine operating state, for example, a map shown in FIG. 10 is used. In this map, the relation between the elapsed time and the correction value Kca is defined. The smallest correction value Kca is equivalent to the correction value used to change the target duration Tca corresponding to the engine operating state at the time point when the precondition for the learning process is satisfied, to the duration corresponding to the mechanical LOW end. That is, the smallest correction value Kca is equivalent to the deviation (<0) of the target duration Tca corresponding to the engine operating state at the time point when the precondition for the learning process is satisfied, from the duration corresponding to the mechanical LOW end. The greatest value of the correction value Kca is "0". When the correction value Kca is smallest when the elapsed time is "0". As the time elapses, the correction value Kca increases at the constant rate $\Delta$ca until the correction value Kca becomes greatest (="0"). The rate $\Delta$ca is the same as that in FIG. 8. The rate $\Delta$ca is (the absolute value of) the amount of change in the correction value Kca per unit time. The time point at which the learning process is finished is used as the reference time point (elapsed time: 0). The correction value Kca is read from the map in FIG. 10 at certain time intervals since the reference time point. The final target duration Tca at each time interval is set to a value obtained by adding the correction value Kca to the target duration Tca that is separately calculated based on the engine operating state. Because the correction value Kca is a negative value, and increases as the time elapses, the final target duration Tca gradually increases as the time elapses. That is, the final target duration Tca comes closer to the value corresponding to the engine operating state as the time elapses.

Therefore, the variable duration mechanism 38 is gradually moved to gradually increase the duration, by controlling the electric motor 43 so that the duration corresponding to the operating position of the variable duration mechanism 38 becomes equal to the final target duration Tca. Accordingly, the amount of intake air passing through the intake valve 25 is increased.

Figure 11:
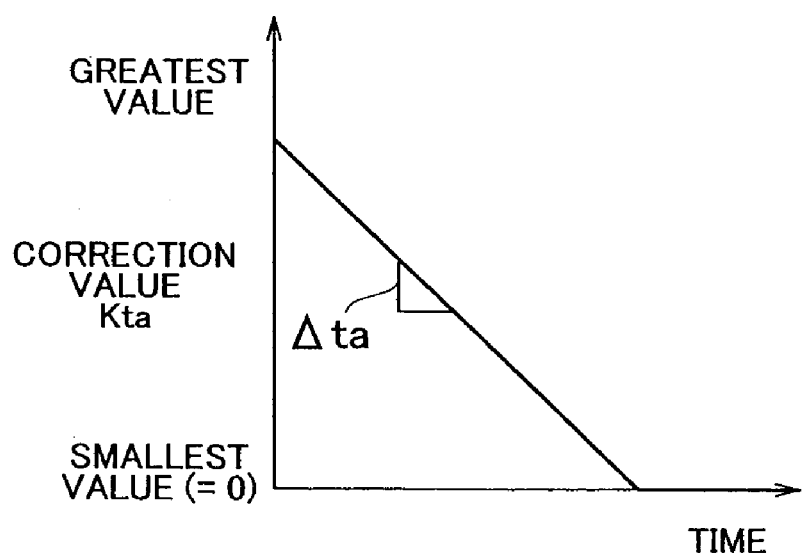
FIG. 11 is a schematic diagram showing the structure of a map used to determine the correction value Kta.

When the opening amount of the throttle valve 15 is gradually returned to the value corresponding to the engine operating state, for example, a map shown in FIG. 11 is used. In this map, the relation between the elapsed time and the correction value Kta is defined. The smallest correction value Kta is "0". The greatest correction value Kta is equal to the upper limit value in FIG. 9. The correction value Kta is greatest when the elapsed time is "0". As the time elapses, the correction value Kta decreases at the constant rate Δta until the correction value Kta becomes smallest (="0"). The rate Δta is the same as that in FIG. 9. The rate Δta is (the absolute value of) the amount of change in the correction value Kta per unit time. The rate Δta of the correction value Kta in the map in FIG. 11 is set to the same value as the rate Δca of the correction value Kca in the map in FIG. 10.

The time point at which the learning process is finished is used as the reference time point (elapsed time: 0). The correction value Kta is read from the map in FIG. 11 at certain time intervals since the reference time point. The final target throttle valve opening amount at each time interval is set to a value obtained by adding the correction value Kta to the target throttle valve opening amount Tta that is separately calculated based on the engine operating state. Because the correction value Kta decreases as the time elapses, the final target throttle valve opening amount Tta gradually decreases as the time elapses. That is, the final target throttle valve opening amount Tta comes closer to the value corresponding to the engine operating state as the time elapses.

Therefore, the throttle valve 15 is gradually rotated so that the opening amount of the throttle valve 15 is gradually decreased, by controlling the actuator 19 so that the actual opening amount of the throttle valve 15 detected by the throttle sensor 55 is equal to the target throttle valve opening amount Tta.

Next, in step 400 in FIG. 7, it is determined whether both of the correction values Kca and Kta are "0". If a negative determination is made in step 400, the learning routine returns to step 380. If an affirmative determination is made in step 400, the learning routine is finished. Accordingly, if an affirmative determination is made in step 400, the target duration Tca becomes equal to the value that is not corrected by the correction value Kca, and the target throttle valve opening amount Tta becomes equal to the value that is not corrected by the correction value Kta. As a result, the intake valve 25 opens and closes in accordance with the duration corresponding to the engine operating state. Also, the opening amount of the throttle valve 15 becomes equal to the value corresponding to the engine operating state.

Figure 6:
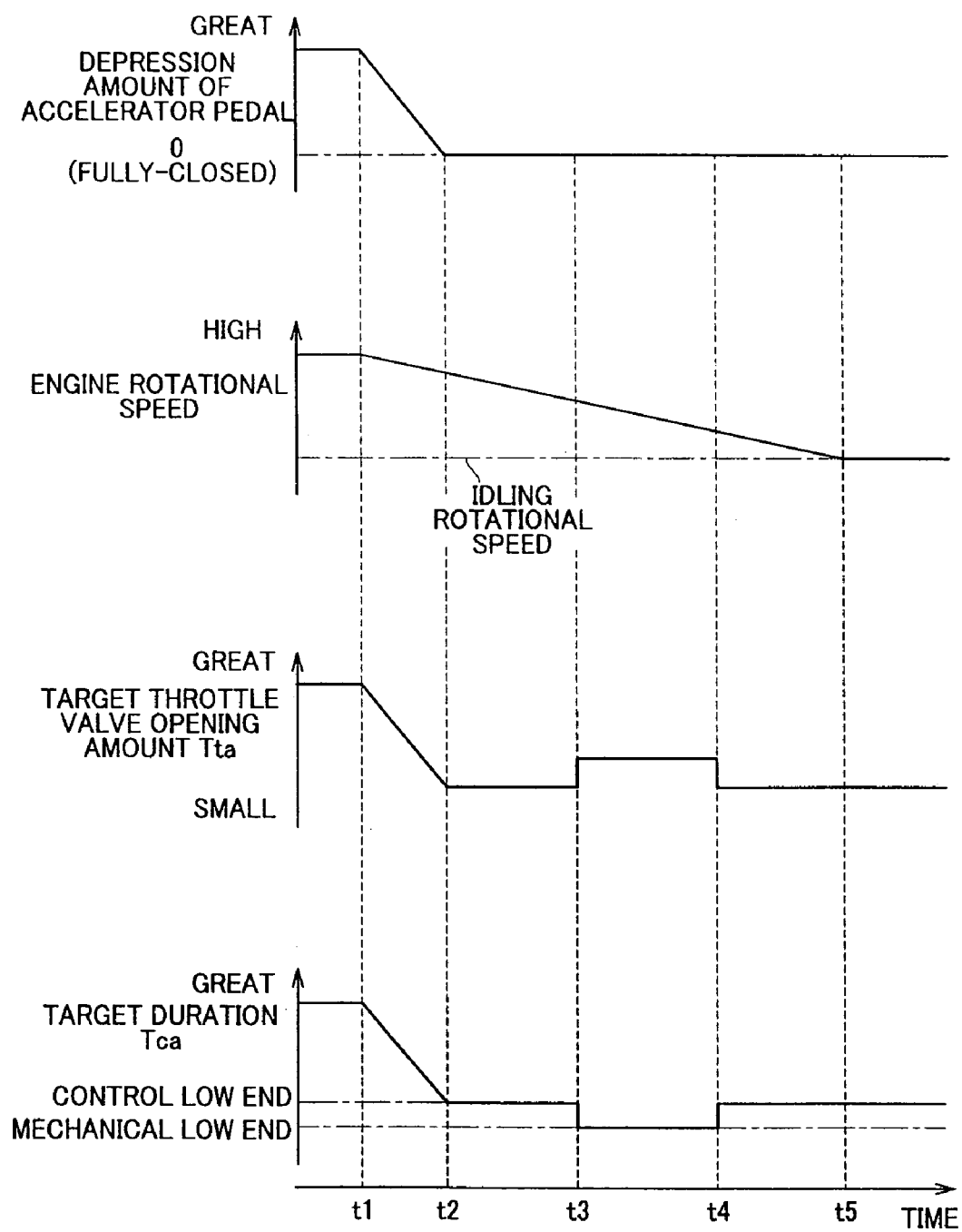
FIG. 6 is a timing chart showing changes in the depression amount of an accelerator pedal, the engine rotational speed, a target throttle valve opening amount, and a target duration.
Figure 12:
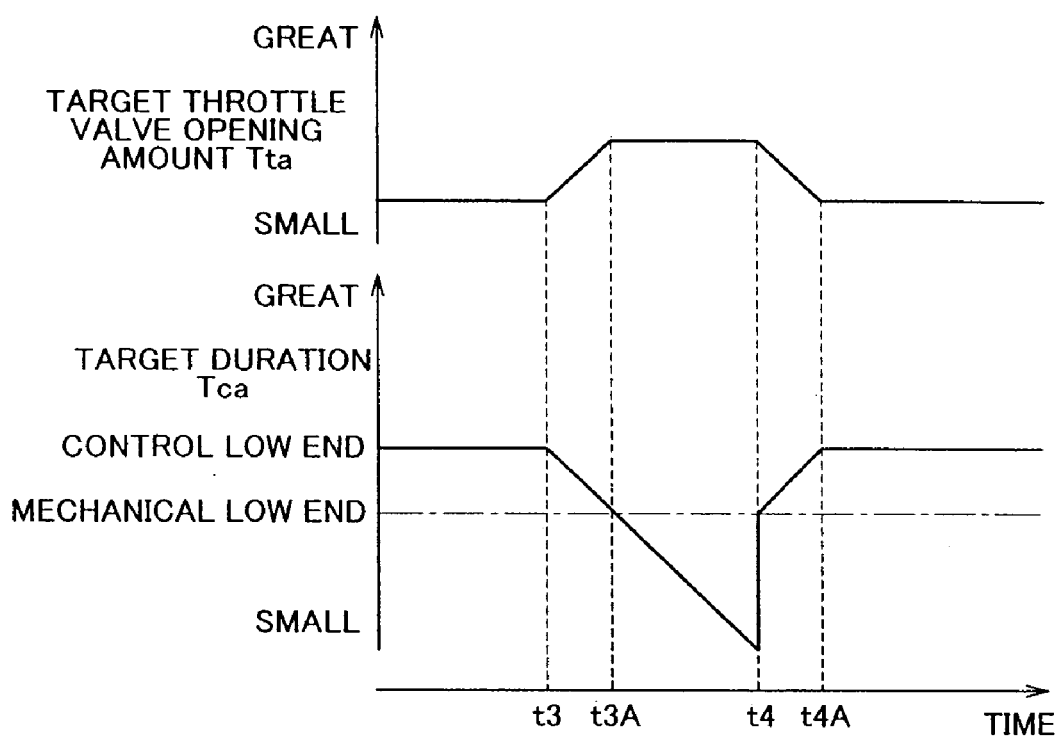
FIG. 12 is a timing chart showing changes in the target throttle valve opening amount and the target duration.

After the learning routine is executed, basically, the engine rotational speed, the target throttle valve opening amount Tta, and the target duration Tca are changed according to the depression of the accelerator pedal 21 operated by the driver, in almost the same manner as in the first embodiment (refer to FIG. 6). However, after the precondition for the learning process is satisfied at time point t3, the target duration Tca and the target throttle valve opening amount Tta are changed in the manner different from that in the first embodiment, as shown in FIG. 12. Also, after the learning process is executed at time point t4, the target duration Tca and the target throttle valve opening amount Tta are changed in the manner different from that in the first embodiment, as shown in FIG. 12.

After time point t3, the target duration Tca gradually decreases as the time elapses. The target throttle valve opening amount Tta gradually increases in accordance with the change in the target duration Tca, as the time elapses. Therefore, the variable duration mechanism 38 is gradually moved to gradually decrease the duration, by controlling the electric motor 43 based on the target duration Tca. The throttle valve 15 is rotated so that the opening amount of the throttle valve 15 is increased, by controlling the actuator 19 based on the target throttle valve opening amount Tta.

At time point t3A, the variable duration mechanism 38 contacts the stopper at the mechanical LOW end. The stopper prevents the variable duration mechanism 38 from further moving to decrease the duration. However, the target duration Tca continues to decrease even after time point t3A. After time point t3A, guard processing is executed to limit the correction value Kta using the upper limit value. That is, the correction value Kta is maintained at the upper limit value. Accordingly, the target throttle valve opening amount Tta is maintained at a constant value.

After time point t4, the target duration Tca gradually increases, and the target throttle valve opening amount Tta gradually decreases as the time elapses. Therefore, the variable duration mechanism 38 is gradually moved to gradually increase the duration, by controlling the electric motor 43 based on the target duration Tca. The throttle valve 15 is gradually rotated so that the opening amount of the throttle valve 15 is gradually decreased, by controlling the actuator 19 based on the target throttle valve opening amount Tta.

At time point t4A, both of the correction values Kca and Kta become "0". That is, the target duration Tca and the target throttle valve opening amount Tta return to the values corresponding to the engine operating state. According to the second embodiment that has been described in detail, the following effects can be obtained in addition to the aforementioned effect (1).

(2) When the precondition for the learning process is satisfied, by gradually decreasing the target duration Tca, the variable duration mechanism 38 is gradually moved to gradually decrease the duration until the variable duration mechanism 38 contacts the stopper at the mechanical LOW end. Also, the target throttle valve opening amount Tta is gradually increased in accordance with the change in the target duration Tca.

After the reference position is learned, the target duration Tca is gradually increased so that the intake valve 25 opens and closes in accordance with the duration corresponding to the engine operating state. Also, according to the increase in the target duration Tca, the target throttle valve opening amount Tta is gradually decreased so that the opening amount of the throttle valve 15 is equal to the value corresponding to the engine operating state.

By slowly operating the variable duration mechanism 38 and the throttle valve 15 in this manner, it is possible to reduce the difference between the actual pressure between the throttle valve 15 and the intake valve 25 and the pressure corresponding to the opening amount of the throttle valve 15 during the transition period. This reduces the influence of the aforementioned delay in the change in the actual pressure on the amount of intake air. Accordingly, it becomes easier to obtain a sufficient amount of intake air to offset the change in the amount of intake air caused by changing (decreasing) the target duration Tca.

(3) As described above, by gradually decreasing the target duration Tca, the variable duration mechanism 38 is slowly moved to gradually decrease the duration. This reduces the impact applied to the variable duration mechanism 38 when it contacts the stopper at the mechanical LOW end.

Figure 13:
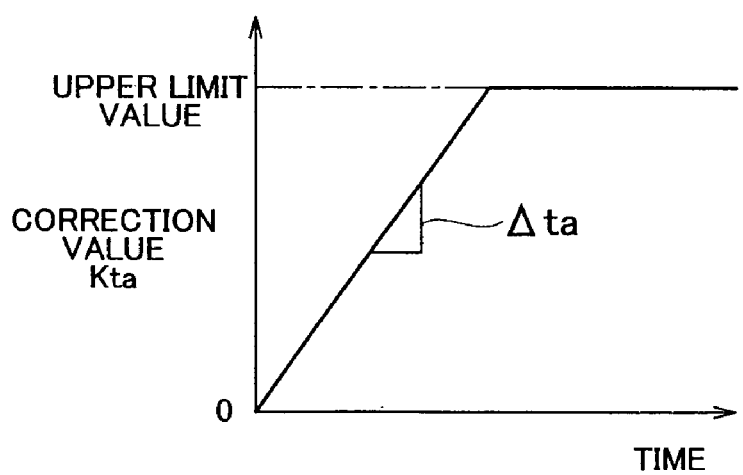
FIG. 13 is a schematic diagram showing the structure of a map used to determine the correction value Kta according to a third embodiment of the invention.
Figure 14:
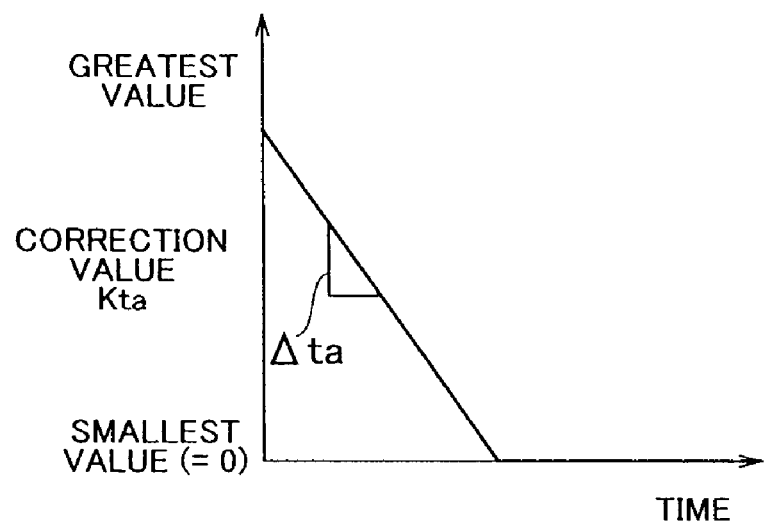
FIG. 14 is a schematic diagram showing the structure of a map used to determine the correction value Kta.
Figure 15:
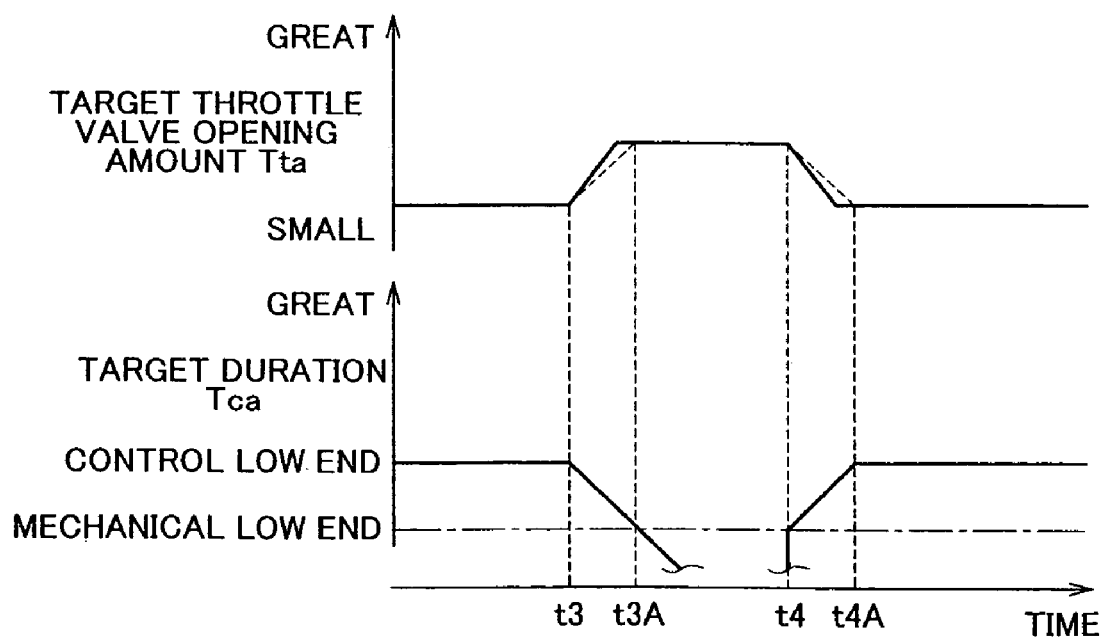
FIG. 15 is a timing chart showing changes in the target throttle valve opening amount and the target duration.

Next, a third embodiment of the invention will be described with reference to FIG. 13 to FIG. 15. In the third embodiment, when the precondition for the learning process is satisfied, the target throttle valve opening amount Tta is increased at the faster rate than the rate at which the target duration Tca is decreased. Also, after the learning process is executed, the target throttle valve opening amount Tta is decreased at the faster rate than the rate at which the target duration Tca is increased. More specifically, in the learning routine in FIG. 7, when the throttle valve opening amount is gradually increased (step 320), a map shown in FIG. 13 is used, instead of the map shown in FIG. 9. Also, when the opening amount of the throttle valve 15 is gradually returned to the value corresponding to the engine operating state (step 380), a map shown in FIG. 14 is used, instead of the map in FIG. 11. The rate Δta of the correction value Kta in FIG. 13 and FIG. 14 is greater than the rate Δca of the correction value Kca in FIG. 8 and FIG. 10. Otherwise, the third embodiment largely corresponds to the second embodiment.

After the learning routine is executed, basically, the engine rotational speed, the target throttle valve opening amount Tta, and the target duration Tca are changed according to the depression of the accelerator pedal 21 operated by the driver in almost the same manner as in the second embodiment. After the precondition for the learning process is satisfied at time point t3, the target throttle valve opening amount Tta is changed in the manner different from that in the second embodiment, as shown in FIG. 15. Also, after the learning process is executed at time point t4, the target throttle valve opening amount Tta is changed in the manner different from that in the second embodiment, as shown in FIG. 15.

After time point t3, the target duration Tca is gradually decreased as the time elapses. The target throttle valve opening amount Tta is gradually increased in accordance with the change in the target duration Tca, as the time elapses. The target throttle valve opening amount Tta is changed at the faster rate than the rate at which the target duration Tca is changed. Accordingly, the throttle valve 15 is operated so that the opening amount of the throttle valve 15 is increased at the speed faster than the speed at which the variable duration mechanism 38 is moved to decrease the duration. Because the throttle valve 15 is operated at such a fast speed, intake air flows into the area between throttle valve 15 and the intake valve 25 early.

After time point t4, the target duration Tca gradually increases as the time elapses until the target duration Tca reaches the value corresponding to the engine operating state. Also, after time point t4, the target throttle valve opening amount Tta gradually decreases until the target throttle valve opening amount Tta reaches the value corresponding to the engine operating state. The target throttle valve opening amount Tta is changed at the faster rate than the rate at which the target duration Tca is changed. Accordingly, the throttle valve 15 is operated so that the opening amount of the throttle valve 15 is decreased at the speed faster than the speed at which the variable duration mechanism 38 is moved to increase the duration. Because the throttle valve 15 is operated at such a fast speed, intake air flows into the area between the throttle valve 15 and the intake valve 25 early.

According to the third embodiment as described, the following effects can be obtained, in addition to the aforementioned effects (1) to (3).

(4) When and after the reference position is learned, the target throttle valve opening amount Tta is gradually changed according to the gradual change in the target duration Tca. The target throttle valve opening amount Tta is changed at the faster rate than the rate at which the target duration Tca is changed. By controlling the actuator 19 so that the duration is equal to the changed target throttle valve opening amount Tta, the throttle valve 15 is operated faster than when the target throttle valve opening amount Tta is gradually changed at the same rate as the rate at which the target duration Tca is changed. Therefore, intake air flows into the area between the throttle valve 15 and the intake valve 25 early, and the pressure of intake air between the throttle valve 15 and the intake valve 25 comes close to the pressure corresponding to the opening amount of the throttle valve 15 early (i.e., the difference between the actual pressure of intake air between the throttle valve 15 and the intake valve 25, and the pressure corresponding to the opening amount of the throttle valve 15 is reduced early) during the transition period. This reduces the influence of the aforementioned delay in the change in the actual pressure on the amount of intake air. Accordingly, it becomes easier to obtain a sufficient amount of intake air to offset the change in the amount of intake air caused by decreasing the target duration Tca.

Figure 16:
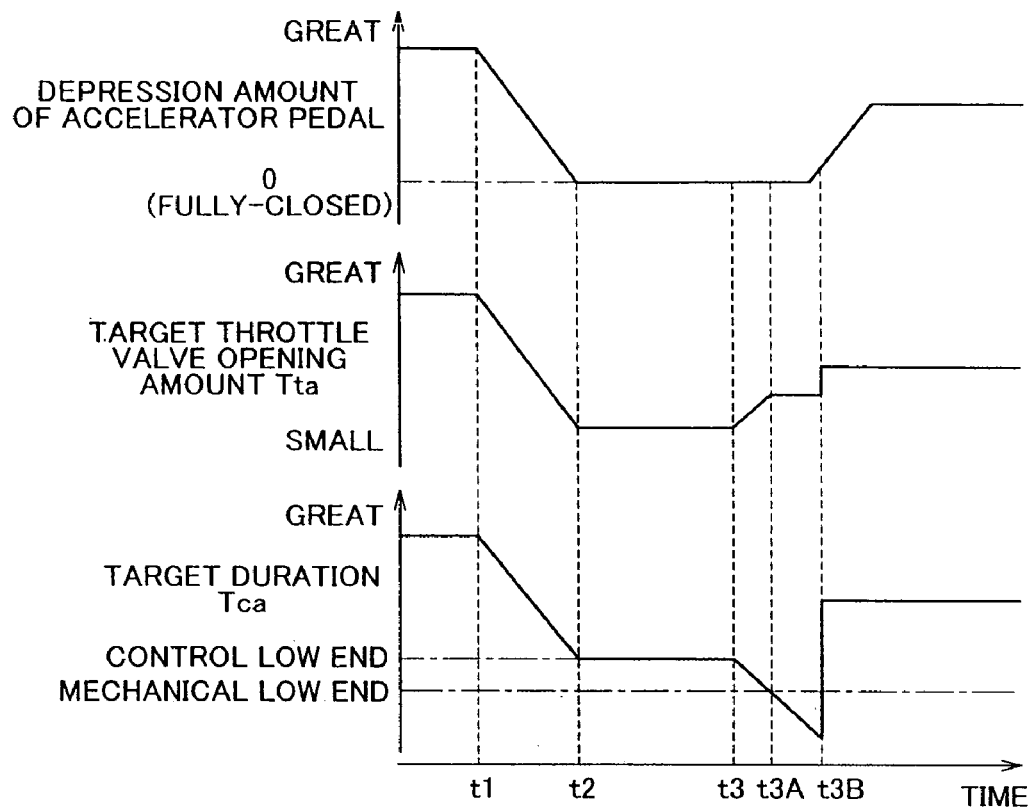
FIG. 16 is a timing chart showing changes in the depression amount of the accelerator pedal, the target throttle valve opening amount, and the target duration according to a fourth embodiment of the invention.

Next, a fourth embodiment of the invention will be described with reference to FIG. 16. Even if acceleration of the engine 11 is required, the reference position may be learned, and the target duration Tca and the target throttle valve opening amount Tta may be gradually changed as in the second embodiment and the third embodiment. In this case, it takes time to supply the cylinder 12 with air of the amount corresponding to the required acceleration, and to generate the output torque necessary for acceleration. Therefore, good acceleration response may not be obtained.

Accordingly, in the fourth embodiment, if acceleration is required and the accelerator pedal 21 is depressed by the driver while the target duration Tca is changed to learn the reference position, the target duration Tca is changed so that the intake valve 25 opens and closes in accordance with the duration corresponding to the engine operating state. Also, the target throttle valve opening amount Tta is changed so that the opening amount of the throttle valve 15 is equal to the value corresponding to the engine operating state.

To change the target duration Tca and the target throttle valve opening amount Tta in the aforementioned manner, for example, it is monitored whether acceleration is required based on the depression amount of the accelerator pedal 21 detected by the accelerator sensor 56, separately from the learning routine in FIG. 7. If acceleration is not required, execution of the learning routine is permitted.

If acceleration is required during execution of the learning routine, the correction value Kta is forcibly set to "0". As a result, correction of the target duration Tca using the correction value Kta is stopped, and the final target duration Tca is set to the target duration that is separately calculated based on the engine operating state at the time point. Then, the electric motor 43 is controlled so that the duration corresponding to the operating position of the variable duration mechanism 38 detected by the position sensor 53 is equal to the target duration Tca. If acceleration is required during execution of the learning routine, the aforementioned control is executed. As a result, the variable duration mechanism 38 is moved to increase the duration, and the intake valve 25 opens and closes in accordance with the duration corresponding to the engine operating state.

If acceleration is required during execution of the learning routine, the correction value. Kta is forcibly set to "0". As a result, correction of the target throttle valve opening amount using the correction value Kta is stopped, and the final target throttle valve opening amount Tta is set to the target throttle valve opening amount Tta that is separately calculated based on the engine operating state at the time point. Then, the actuator 19 for the throttle valve 15 is controlled so that the actual opening amount of the throttle valve 15 detected by the throttle sensor 55 is equal to the target throttle valve opening amount Tta.

After the learning routine is executed, basically, the engine rotational speed, the target throttle valve opening amount Tta, and the target duration Tca are changed according to the depression of the accelerator pedal 21 operated by the driver in almost the same manner as in the second embodiment and the third embodiment. As shown in FIG. 16, when acceleration is required during execution of the routine for learning the reference position, the target duration Tca and the target throttle valve opening amount Tta are changed in a manner different from that in the second embodiment and the third embodiment.

For example, if acceleration is required at time point t3B, the target duration Tca and the target throttle valve opening amount Tta are forcibly set to the values corresponding to the engine operating state (required acceleration), irrespective of the progress of the process of learning the reference position. Then, the variable duration mechanism 38 is moved to increase the duration, by controlling the electric motor 43 so that the duration corresponding to the operating position of the variable duration mechanism 38 detected by the position sensor 53 is equal to the target duration Tca. Also, the throttle valve 15 is rotated so that the opening amount of the throttle valve 15 is increased, by controlling the actuator 19 for the throttle valve 15 so that the actual opening amount of the throttle valve 15 detected by the throttle sensor 55 is equal to the target throttle valve opening amount Tta. By adjusting the opening amount of the throttle valve 15 and the duration of the intake valve 25 in the aforementioned manner, the amount of air taken into the cylinder 12 is adjusted to the amount necessary for acceleration.

According to the fourth embodiment that has been described in detail, the following effect can be obtained in addition to the aforementioned effects (1) to (4).

(5) If acceleration of the engine 11 is required while the target duration Tca is changed to learn the reference position, the target duration Tca is changed so that the intake valve 25 opens and closes in accordance with the duration corresponding to the engine operating state, irrespective of the progress of the learning process. Also, the target throttle valve opening amount Tta is changed so that the opening amount of the throttle valve 15 is equal to the value corresponding to the engine operating state. Therefore, by opening and closing the intake valve 25 in accordance with the changed target duration Tca and making the opening amount of the throttle valve 15 equal to the changed target throttle valve opening amount Tta, air of the amount corresponding to the required acceleration can be taken into the cylinder 12 early. In the engine 11, the output torque necessary for acceleration can be generated in a short time, and good acceleration response can be obtained.

Figure 17:
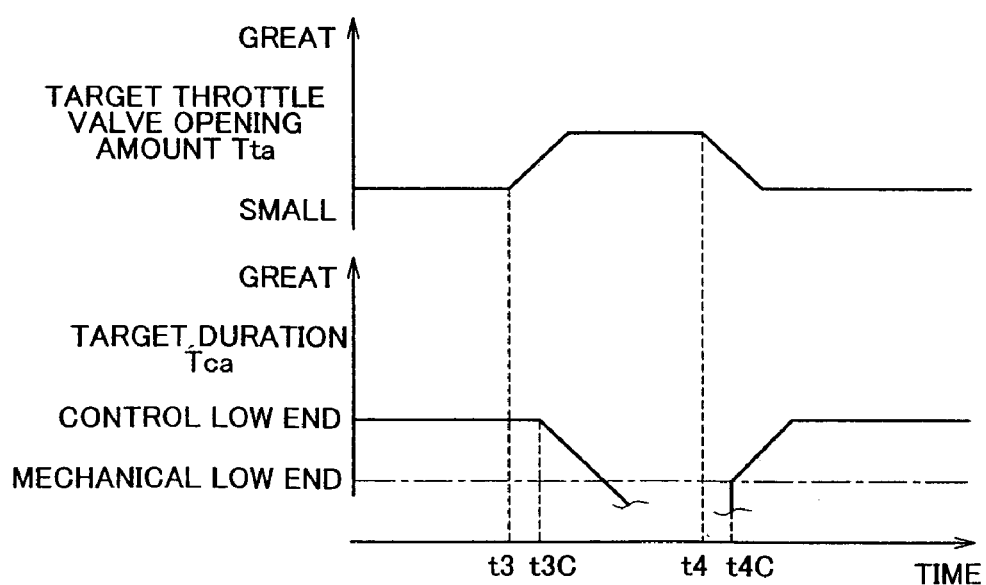
FIG. 17 is a timing chart showing changes in the target throttle valve opening amount and the target duration in the case where the target throttle valve opening amount starts to change before the target duration starts to change according to a fifth embodiment of the invention.

Next, a fifth embodiment of the invention will be described with reference to FIG. 17. In the third embodiment, the target throttle valve opening amount Tta is changed at the faster rate than the rate at which the target duration Tca is changed. Thus, in the fifth embodiment, the target throttle valve opening amount Tta starts to change before the target duration Tca starts to change as shown in FIG. 17. In other words, there is a delay before the target duration Tca starts to change after the target throttle valve opening amount Tta starts to change.

That is, when the precondition for the learning process is satisfied (at time point t3), first, the target throttle valve opening amount Tta stars to increase. Slightly after that, at time point t3C, the target duration Tca of the intake valve 25 starts to decrease. After the reference position is learned (at time point t4), the target throttle valve opening amount Tta starts to decrease. After a brief delay, at time point t4C, the target duration Tca of the intake valve 25 also starts to increase.

By changing the target duration Tca and the target throttle valve opening amount Tta in this manner, the same effects as in the third embodiment can be obtained. That is, by operating the variable duration mechanism 38 and the throttle valve 15 in the aforementioned manner, intake air flows into the area (for example, the surge tank 16) between the throttle valve 15 and the intake valve 25 early. Therefore, the actual pressure of intake air between the throttle valve 15 and the intake valve 25 increases early during the transition period. That is, the actual pressure of intake air between the throttle valve 15 and the intake valve 25 comes close to the pressure corresponding to the opening amount of the throttle valve 15 early (i.e., the difference between the actual pressure and the pressure corresponding to the opening amount of the throttle valve 15 is reduced early). This reduces the influence of the aforementioned delay in the change in the actual pressure on the amount of intake air. Therefore, it becomes easier to obtain a sufficient amount of intake air to offset the change in the amount of intake air caused by changing the target duration Tca.

In each of the first, second, and fourth embodiments, the target throttle valve opening amount Tta may start change before the target duration Tca starts to change as in the fifth embodiment. The invention can be applied to the case where an absolute position sensor is used to detect the valve characteristic (duration) of the intake valve, instead of a relative position sensor.

Any intake-air-amount adjustment means provided upstream of the intake valve 25 may be used to adjust the amount of intake air passing through the intake passage 18. Accordingly, a device having the configuration different from that of the throttle valve 15 may be used as the intake-air-amount adjustment means.

The operation amount different from the rotational angle of the electric motor 43 may be used to determine the operating position of the variable duration mechanism 38. For example, the amount of displacement of the control shaft 41 may be detected.

The invention can be applied to the case where an actuator different from the electric motor 43 is used to drive the variable duration mechanism 38.

The variable valve-characteristic mechanism may also be limited to changing only the duration of the intake valve 25, or only the maximum lift of the intake valve 25.

The invention may be used in an internal combustion engine in which the valve characteristic (at least one of the duration and the maximum lift) of an exhaust valve 26 is changed in addition to the valve characteristic of the intake valve 25.

The variable duration mechanism may have the configuration different from that in the aforementioned embodiments. For example, the intake cam of the intake camshaft may be a three-dimensional cam whose profile varies in the axial direction, and the variable duration mechanism may change the duration according to the engine operating state by displacing the intake camshaft in the axial direction by an actuator. In other words, any mechanism that can change the valve characteristic of the intake valve 25 according to the engine operating state may be used.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A control apparatus for an internal combustion engine which includes a variable valve-characteristic mechanism that changes a valve characteristic that includes at least one of a duration and a maximum lift of an intake valve, comprising:
a controller that detects an operating position of the variable valve-characteristic mechanism, and controls the variable valve-characteristic mechanism so that a value of the valve characteristic corresponding to the operating position is equal to a target value of the valve characteristic corresponding to an engine operating state, wherein
the controller changes the target value of the valve characteristic so that the intake valve opens and closes in accordance with a specific value of the valve characteristic, and learns, as a reference position for a control of the valve characteristic, the operating position of the variable valve-characteristic mechanism after the target value of the valve characteristic is changed; and
the controller controls an intake-air-amount adjustment device provided upstream of the intake valve so that the intake-air-amount adjustment device offsets a change in an amount of intake air caused by changing the target value of the valve characteristic when the reference position is learned.

2. The control apparatus for the internal combustion engine according to claim 1, wherein:
the intake-air-amount adjustment device is a throttle valve provided upstream of a surge tank;
the controller gradually changes the target value of the valve characteristic so that the intake valve opens and closes in accordance with the specific value of the valve characteristic; and
the controller gradually changes a target opening amount of the throttle valve in accordance with the change in the target value of the valve characteristic when the reference position is learned.

3. The control apparatus for the internal combustion engine according to claim 2, wherein the target opening amount of the throttle valve is changed at a faster rate than a rate at which the target value of the valve characteristic is changed.

4. The control apparatus for the internal combustion engine according to claim 1, wherein the intake-air-amount adjustment device is a throttle valve provided upstream of a surge tank, and the controller starts to change a target opening amount of the throttle valve before the controller starts to change the target value of the valve characteristic when the reference position is learned.

5. The control apparatus for the internal combustion engine according to claim 1, wherein:
the intake-air-amount adjustment device is a throttle valve provided upstream of a surge tank;
after the reference position is learned, the controller gradually changes the target value of the valve characteristic so that the intake valve opens and closes in accordance with a value of the valve characteristic corresponding to the engine operating state; and
the controller gradually changes a target opening amount of the throttle valve in accordance with the change in the target value of the valve characteristic after the reference position is learned.

6. The control apparatus for the internal combustion engine according to claim 5, wherein if acceleration of the internal combustion engine is required while the target value of the valve characteristic is changed, the controller changes the target value of the valve characteristic so that the intake valve opens and closes in accordance with the value of the valve characteristic corresponding to the engine operating state, and the controller changes the target opening amount so that an opening amount of the throttle valve is equal to a value corresponding to the engine operating state.

7. The control apparatus for the internal combustion engine according to claim 1, wherein the controller counts the number of pulsed signals output from a position sensor each time the variable valve-characteristic mechanism is operated by a certain operation amount, and the controller detects the operating position of the variable valve-characteristic mechanism based on the number of pulsed signals counted.

8. A control method for an internal combustion engine which includes a variable valve-characteristic mechanism that changes a valve characteristic that includes at least one of a duration and a maximum lift of an intake valve, comprising:
detecting an operating position of the variable valve-characteristic mechanism, and controlling the variable valve-characteristic mechanism so that a value of the valve characteristic corresponding to the operating position is equal to a target value of the valve characteristic corresponding to an engine operating state;
changing the target value of the valve characteristic so that the intake valve opens and closes in accordance with a specific value of the valve characteristic, and learning, as a reference position for a control of the valve characteristic, the operating position of the variable valve-characteristic mechanism after the target value of the valve characteristic is changed; and
controlling an intake-air-amount adjustment device provided upstream of the intake valve so that the intake-air-amount adjustment device offsets a change in an amount of intake air caused by changing the target value of the valve characteristic.

9. The control method for the internal combustion engine according to claim 8, further comprising:
gradually changing the target value of the valve characteristic so that the intake valve opens and closes in accordance with the specific value of the valve characteristic; and
gradually changing a target opening amount of a throttle valve provided upstream of a surge tank, which is the intake-air-amount adjustment device, in accordance with the change in the target value of the valve characteristic when the reference position is learned.

10. The control method for the internal combustion engine according to claim 9, further comprising:
gradually changing the target opening amount of the throttle valve at a faster rate than a rate at which the target value of the valve characteristic is changed.

11. The control method for the internal combustion engine according to claim 8, wherein
a target opening amount of a throttle valve provided upstream of a surge tank, which is the intake-air-amount adjustment device, starts to change before the target value of the valve characteristic starts to change when the reference position is learned.

12. The control method for the internal combustion engine according to claim 8, further comprising:

gradually changing the target value of the valve characteristic so that the intake valve opens and closes in accordance with a value of the valve characteristic corresponding to the engine operating state after the reference position is learned; and gradually changing a target opening amount of a throttle valve provided upstream of a surge tank, which is the intake-air-amount adjustment device, in accordance with the change in the target value of the valve characteristic after the reference position is learned.

13. The control method for the internal combustion engine according to claim 12, further comprising:

changing the target value of the valve characteristic so that the intake valve opens and closes in accordance with the value of the valve characteristic corresponding to the engine operating state, and changing the target opening amount so that an opening amount of the throttle valve is equal to a value corresponding to the engine operating state, if acceleration of the internal combustion engine is required while the target value of the valve characteristic is changed.

* * * * *